(12) United States Patent
Hayashi

(10) Patent No.: US 11,198,221 B2
(45) Date of Patent: Dec. 14, 2021

(54) AUTONOMOUSLY ACTING ROBOT THAT WEARS CLOTHES

(71) Applicant: GROOVE X, Inc., Tokyo (JP)

(72) Inventor: Kaname Hayashi, Tokyo (JP)

(73) Assignee: GROOVE X, INC., Tokyo (JP)

( * ) Notice: Subject to any disclaimer, the term of this patent is extended or adjusted under 35 U.S.C. 154(b) by 365 days.

(21) Appl. No.: 16/200,500

(22) Filed: Nov. 26, 2018

(65) Prior Publication Data

US 2019/0160683 A1 May 30, 2019

Related U.S. Application Data

(63) Continuation of application No. PCT/JP2017/021099, filed on Jun. 7, 2017.

(30) Foreign Application Priority Data

Jul. 8, 2016 (JP) .............................. JP2016-135713

(51) Int. Cl.
*B25J 11/00* (2006.01)
*A63H 11/00* (2006.01)
(Continued)

(52) U.S. Cl.
CPC .............. *B25J 11/001* (2013.01); *A63H 3/28* (2013.01); *A63H 11/00* (2013.01); *B25J 9/1697* (2013.01);
(Continued)

(58) Field of Classification Search
CPC ...... B25J 11/001; B25J 9/1697; B25J 19/023; B25J 13/08; A63H 11/00; A63H 3/28;
(Continued)

(56) References Cited

U.S. PATENT DOCUMENTS 5,733,131 A * 3/1998 Park ........................ G09B 5/065
340/7.48
5,746,602 A * 5/1998 Kikinis .................... A63H 3/48
369/30.02
(Continued)

FOREIGN PATENT DOCUMENTS

CN 1335800 A 2/2002
DE 29904916 U1 7/2000
(Continued)

OTHER PUBLICATIONS

Written Opinion of the ISA in PCT/JP2017/021099, dated Aug. 29, 2017, 16pp.
(Continued)

*Primary Examiner* — Bhavesh V Amin
(74) *Attorney, Agent, or Firm* — Hauptman Ham, LLP

(57) ABSTRACT

An aspect of the invention provides technology of changing behavioral characteristics when clothing is put on a robot. An autonomously acting robot includes an operation control unit that controls an operation of the robot, a drive mechanism that executes an operation specified by the operation control unit, and an equipment detecting unit that detects clothing worn by the robot. The robot refers to action restriction information correlated in advance to the clothing, and regulates an output of the drive mechanism.

20 Claims, 11 Drawing Sheets

(51) Int. Cl.
*A63H 3/28* (2006.01)
*B25J 9/16* (2006.01)
*B25J 19/02* (2006.01)
*A63H 3/00* (2006.01)

(52) U.S. Cl.
CPC ............. *B25J 19/023* (2013.01); *A63H 3/006* (2013.01); *A63H 2200/00* (2013.01)

(58) Field of Classification Search
CPC ...... A63H 2200/00; A63H 3/006; A63H 3/00; A63H 3/52; A63H 3/48; A63H 33/26; A63H 3/02; A63H 3/36; Y10T 29/53048; Y10T 29/53365; Y10T 29/5337; G06N 3/008; H01R 13/24; H01R 13/26; H01R 13/4536; G05B 2219/33051; G05B 2219/40302; G05B 2219/39254; Y10S 29/53461; A63J 21/00

See application file for complete search history.

(56) References Cited

U.S. PATENT DOCUMENTS

| | | | | |
|---|---|---|---|---|
| 5,752,880 | A * | 5/1998 | Gabai | A63H 30/04 434/308 |
| 6,149,490 | A * | 11/2000 | Hampton | A63H 3/28 446/298 |
| 6,160,540 | A * | 12/2000 | Fishkin | G06F 3/0414 345/184 |
| 6,505,098 | B1 * | 1/2003 | Sakamoto | A63H 11/00 700/245 |
| 6,565,371 | B1 * | 5/2003 | Watanabe | H01R 13/4536 439/138 |
| 6,711,469 | B2 * | 3/2004 | Sakamoto | A63H 3/52 700/245 |
| 8,961,260 | B2 * | 2/2015 | Weston | A63J 21/00 446/175 |
| 9,796,093 | B2 * | 10/2017 | Mascorro Medina | G06Q 30/016 |
| 10,576,618 | B2 * | 3/2020 | Otsuka | B25J 13/084 |
| 2003/0078696 | A1 * | 4/2003 | Sakamoto | A63H 11/00 700/245 |
| 2003/0109959 | A1 * | 6/2003 | Tajima | G06N 3/008 700/245 |
| 2004/0113777 | A1 * | 6/2004 | Matsuhira | G08B 13/19645 340/541 |
| 2005/0235451 | A1 * | 10/2005 | Yan | A47L 9/009 15/319 |
| 2006/0178775 | A1 * | 8/2006 | Zhang | B25J 13/02 700/245 |
| 2011/0270443 | A1 * | 11/2011 | Kamiya | G05B 19/401 700/245 |
| 2014/0295731 | A1 * | 10/2014 | Weston | A63H 3/48 446/369 |
| 2016/0114488 | A1 * | 4/2016 | Mascorro Medina | B25J 11/008 700/259 |
| 2017/0083107 | A1 * | 3/2017 | Shim | G06F 3/047 |
| 2018/0039355 | A1 * | 2/2018 | Hsu | G02F 1/133305 |
| 2018/0075403 | A1 * | 3/2018 | Mascorro Medina | G06Q 10/087 |
| 2018/0106692 | A1 * | 4/2018 | Ciocarlie | G06F 3/042 |
| 2018/0333862 | A1 * | 11/2018 | Hayashi | B25J 13/08 |
| 2019/0105783 | A1 * | 4/2019 | Al Moubayed | A63H 13/005 |

FOREIGN PATENT DOCUMENTS

| | | |
|---|---|---|
| EP | 1155786 A1 | 11/2001 |
| JP | 2000-93664 A | 4/2000 |
| JP | 2000-323219 A | 11/2000 |
| JP | 2001-191275 A | 7/2001 |
| JP | 2001-191276 A | 7/2001 |
| JP | 2002-86380 A | 3/2002 |
| JP | 2003-208161 A | 7/2003 |
| JP | 2005-13391 A | 1/2005 |
| JP | 2013-13946 A | 1/2013 |

OTHER PUBLICATIONS

International Search Report in PCT/JP2017/021099, dated Aug. 29, 2017, 6pp.
Office Action in JP Application No. 2017-564924, dated Mar. 20, 2018, 6pp.
Office Action in DE Application No. 112017002606.7, dated Mar. 25, 2019, 17pp.
Office Action in CN application No. 201780041601.9, dated Jun. 15, 2021. 16pp.
Examination report in GB application No. 1818887.0, dated Feb. 3, 2021. 4pp.

* cited by examiner

| CLOTHING ID | ACTION RESTRICTION (%) | | | |
|---|---|---|---|---|
| | ACTUATOR 1 | ACTUATOR 2 | ... | ACTUATOR N |
| 01 | 0 | -5 | | -1.5 |
| 02 | -7 | -10 | | -20 |
| 03 | -4 | -50 | ... | -10 |
| 04 | -1 | 0 | | 0 |
| ⋮ | ⋮ | ⋮ | | ⋮ |

| CLOTHING ID | WEARING CONDITION | SPECIAL MOTION | ACTUATING CONDITION |
|---|---|---|---|
| 01 | – | C01 | 10 O'CLOCK IN THE MORNING |
| 02 | AIR TEMPERATURE 20 DEGREES OR HIGHER | C02 | MUSIC A |
|  |  | C03 | THREE PEOPLE OR MORE VISUALLY RECOGNIZED |
| 03 | GOOD WEATHER | C04 | MUSIC B |
| 01 + 03 | – | C05 | BIRTHDAY |
| 04 | – | C06 | CHILDREN'S DAY |
|  |  | C07 | AIR TEMPERATURE 5 DEGREES OR LOWER |
| ⋮ | ⋮ | ⋮ |  |

| CLOTHING ID | ATTACHMENT |
|:---:|:---:|
| 01 | 27 |
| 02 | 84 |
| 03 | 70 |
| 04 | −90 |
| 05 | 0 |
| ⋮ | ⋮ |

250

AUTONOMOUSLY ACTING ROBOT THAT WEARS CLOTHES

RELATED APPLICATIONS

The present application is a continuation of International Application No. PCT/JP2017/021099, filed Jun. 7, 2017, which claims priority from Japanese Application No. 2016-135713, filed Jul. 8, 2016, the disclosures of which applications are hereby incorporated by reference herein in their entirety.

TECHNICAL FIELD

The present invention relates to a robot that autonomously selects an action in accordance with an internal state or an external environment.

BACKGROUND ART

A human keeps a pet in a search for solace. Meanwhile, for various reasons such as not being able to secure sufficient time to look after a pet, not having a living environment in which a pet can be kept, having an allergy, or hating the thought of being parted by death, there are many people who give up on keeping a pet. If there were a robot that performed the role of a pet, it may be that people who cannot keep a pet would also be provided with the kind of solace that a pet provides (refer to JP-A-2000-323219)

SUMMARY OF INVENTION

Technical Problem

A human has a tendency of attempting to put clothes on a target of affection. For example, a human attempts to express affection by attempting to put various clothes on even an inanimate object such as a soft toy. One reason for the popularity of small dogs is that small dogs answer the human desire to put cute clothes on a target of affection. Consequently, it is thought that if a robot were such that a human felt a desire to put clothes on the robot, empathy toward the robot could be considerably increased.

The invention, being an invention completed based on the heretofore described idea, has a main object of providing technology that changes behavioral characteristics when clothes are put on a robot.

Solution to Problem

An autonomously acting robot in an aspect of the invention includes an operation control unit that controls an operation of the robot, a drive mechanism that executes an operation specified by the operation control unit, and an equipment detecting unit that detects clothing worn by the robot.

The operation control unit changes behavioral characteristics of the robot in accordance with the clothing worn.

Advantageous Effects of Invention

According to the invention, empathy toward a robot is easily increased.

BRIEF DESCRIPTION OF DRAWINGS

FIG. 11 is a data structure diagram of a special motion storage unit.
FIG. 13 is a data structure diagram of an attachment information storage unit.

DESCRIPTION OF EMBODIMENTS

Figure 1A:
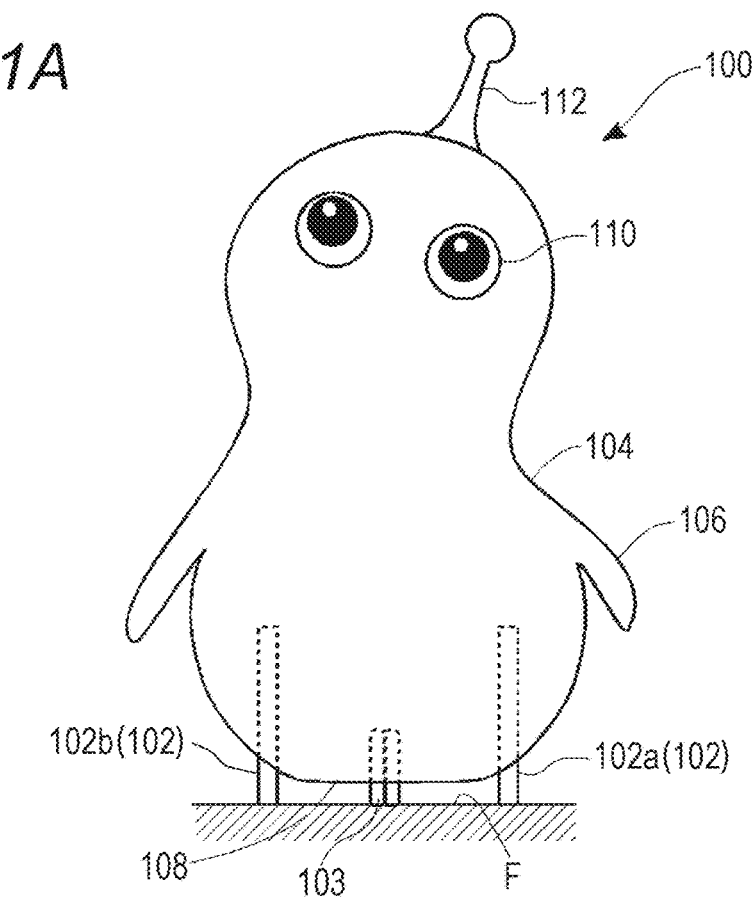
FIG. 1A is a front external view of a robot.
Figure 1B:
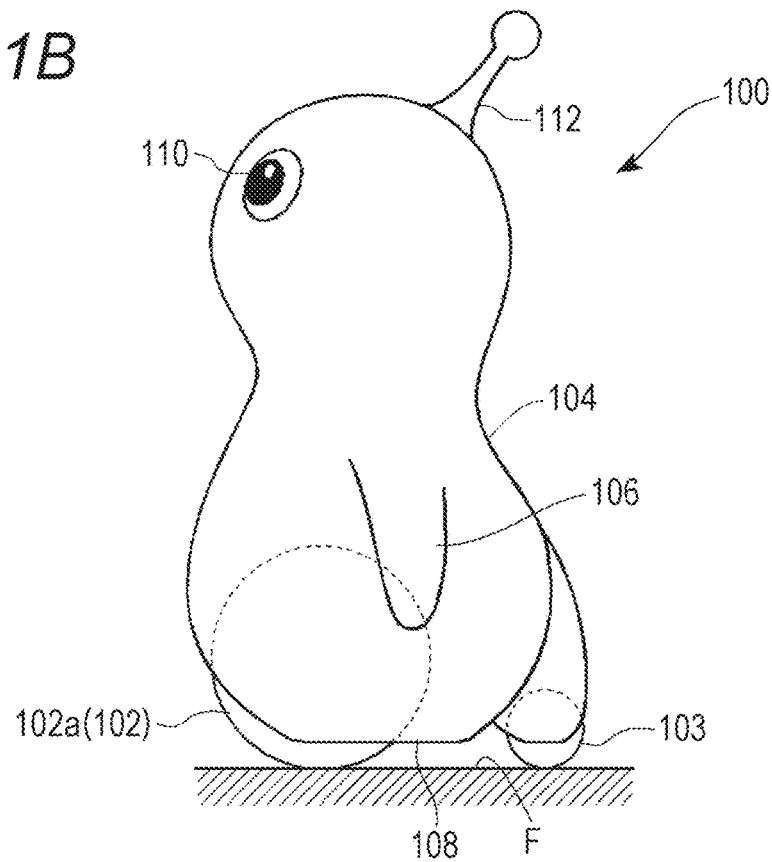
FIG. 1B is a side external view of the robot.

FIG. 1A is a front external view of a robot 100. FIG. 1B is a side external view of the robot 100.

The robot 100 in this embodiment is an autonomously acting robot that determines an action or gesture based on an external environment and an internal state. The external environment is recognized using various kinds of sensor, such as a camera or a thermosensor. The internal state is quantified as various parameters that express emotions of the robot 100. These will be described hereafter.

With indoor action as a precondition, the robot 100 has, for example, an interior of an owner's home as an action range. Hereafter, a human involved with the robot 100 will be called a "user", and a user forming a member of a home to which the robot 100 belongs will be called an "owner".

A body 104 of the robot 100 has a rounded form all over, and includes an outer skin formed of a soft material having elasticity, such as urethane, rubber, a resin, or a fiber. The robot 100 may be clothed. By the body 104, which is rounded, soft, and pleasant to touch, being adopted, the robot 100 provides a user with a sense of security and a pleasant tactile sensation.

A total weight of the robot 100 is 15 kilograms or less, preferably 10 kilograms or less, and more preferably still 5 kilograms or less. A majority of babies start to walk by themselves by 13 months after birth. An average weight of a baby 13 months after birth is a little over 9 kilograms for boys, and a little under 9 kilograms for girls. Because of this, when the total weight of the robot 100 is 10 kilograms or less, a user can hold the robot 100 with an effort practically equivalent to that of holding a baby that cannot walk by itself. An average weight of a baby less than 2 months after birth is less than 5 kilograms for both boys and girls. Consequently, when the total weight of the robot 100 is 5 kilograms or less, a user can hold the robot 100 with an effort practically equivalent to that of holding a very young baby.

Advantages of a user holding the robot 100 easily, and wanting to hold the robot 100, are realized by the attributes of appropriate weight and roundness, softness, and pleasantness of touch. For the same reasons, a height of the robot 100 is desirably 1.2 meters or less, or preferably 0.7 meters or less. Being able to be held is an important concept of the robot 100 in this embodiment.

The robot 100 includes three wheels for three-wheeled traveling. As shown in the drawings, the robot 100 includes a pair of front wheels 102 (a left wheel 102a and a right wheel 102b) and one rear wheel 103. The front wheels 102 are drive wheels, and the rear wheel 103 is a driven wheel. Although the front wheels 102 have no steering mechanism, rotational speed and a direction of rotation can be individually controlled. The rear wheel 103 is formed of a so-called omni wheel, and rotates freely in order to cause the robot 100 to move forward and back, and left and right. By controlling so that the rotational speed of the right wheel 102b is greater than that of the left wheel 102a, the robot 100 can turn left or rotate counterclockwise. By controlling so that the rotational speed of the left wheel 102a is greater than that of the right wheel 102b, the robot 100 can turn right or rotate clockwise.

The front wheels 102 and the rear wheel 103 can be completely stored in the body 104 using a drive mechanism (a pivoting mechanism and a linking mechanism). A greater portion of each wheel is hidden by the body 104 when traveling too, but when each wheel is completely stored in the body 104, the robot 100 is in a state of being unable to move. That is, the body 104 descends, and sits on a floor surface F, in accompaniment to an operation of the wheels being housed. In the sitting state, a flat seating face 108 (a ground bottom face) formed in a bottom portion of the body 104 comes into contact with the floor surface F.

The robot 100 has two arms 106. The arms 106 do not have a function of gripping an object. The arms 106 can perform simple actions such as raising, waving, and oscillating. The two arms 106 can also be controlled individually.

A camera is incorporated in an eye 110. The eye 110 is also capable of an image display using a liquid crystal element or an organic EL element. In addition to the camera incorporated in the eye 110, various sensors, such as a highly directional microphone and an ultrasonic sensor, are mounted in the robot 100. Also, a speaker is incorporated, and the robot 100 is also capable of simple speech.

A horn 112 is attached to a head portion of the robot 100. As the robot 100 is lightweight, as heretofore described, a user can also lift up the robot 100 by grasping the horn 112.

Figure 2:
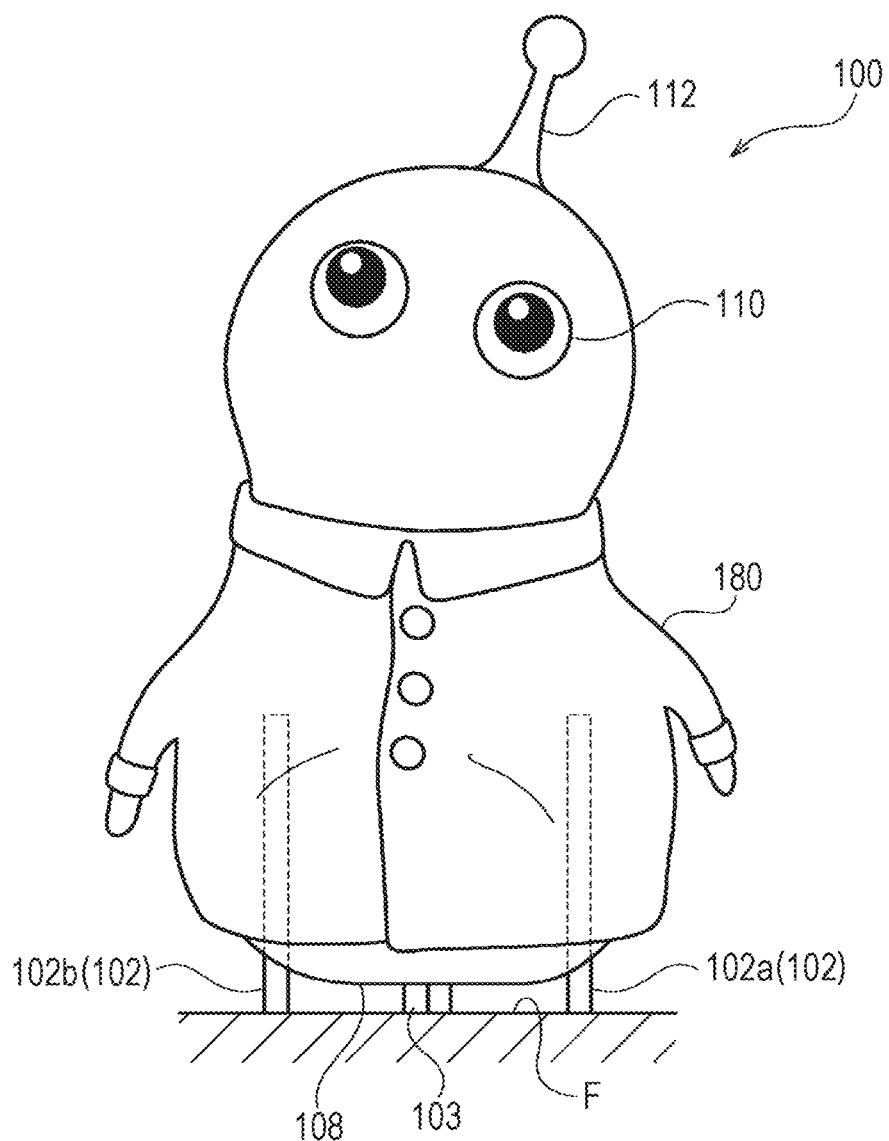
FIG. 2 is a front external view of a robot when wearing clothing.

FIG. 2 is a front external view of the robot 100 when wearing clothes.

A user can put clothing 180 on the robot 100. There are various kinds of the clothing 180. An RFID (radio frequency identifier) tag is sewn into the clothing 180. The RFID tag emits "clothing ID" that identifies clothing at close range. By reading the clothing ID from the RFID tag, the robot 100 can recognize that the robot 100 is wearing the clothing 180, and recognize the category of the clothing 180 that the robot 100 is wearing. The robot 100 may wear multiple items of the clothing 180 in layers.

Various kinds of clothing-related information (hereafter, collectively called "clothing attribute information") are correlated to the clothing ID. The clothing attribute information is managed by a server 200 to be described hereafter coordinated with the robot 100, or by an external database 182 operated by a clothing maker or the like. Details of the clothing attribute information will be described hereafter.

Figure 3:
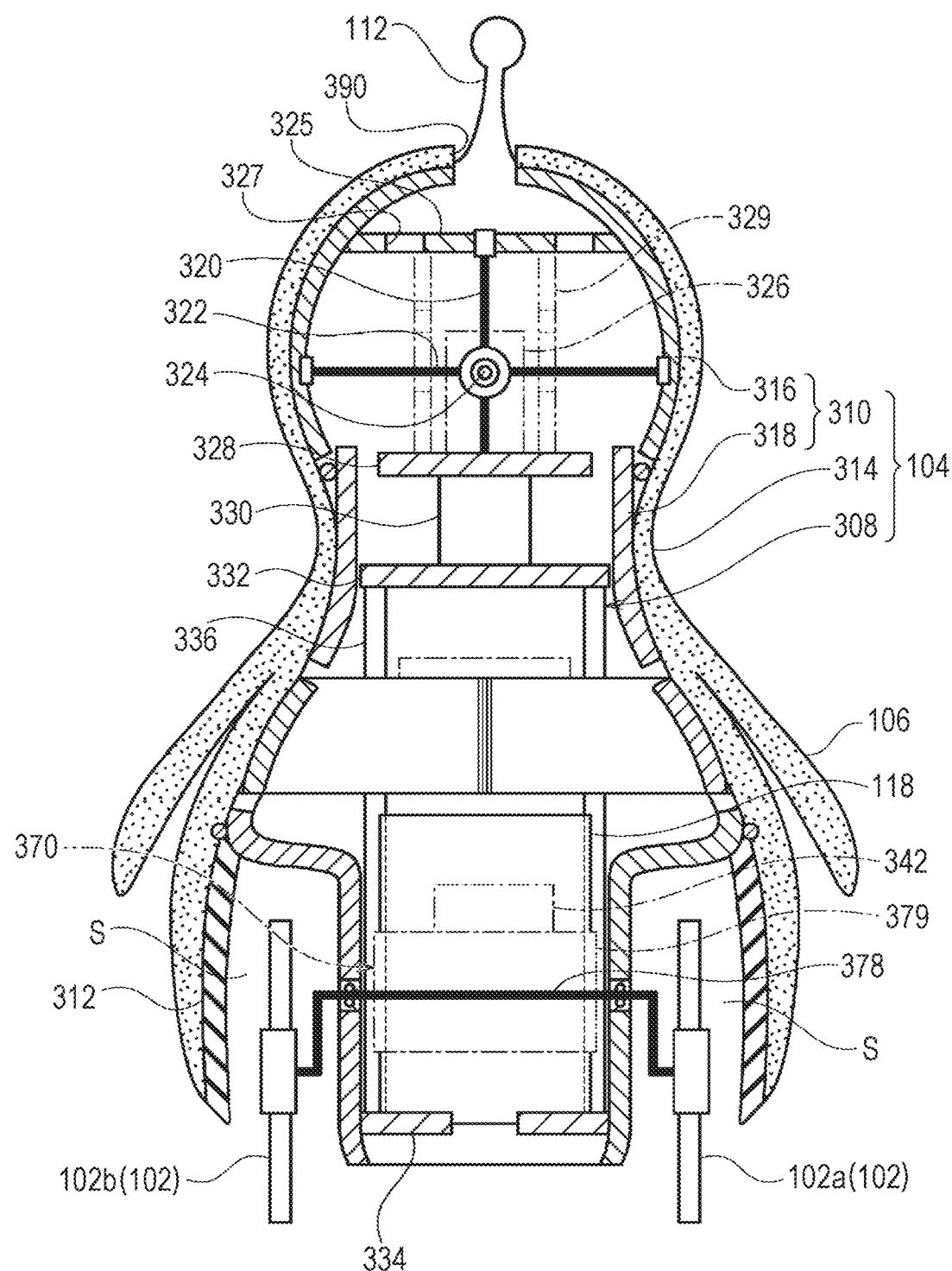
FIG. 3 is a sectional view schematically representing a structure of the robot.

FIG. 3 is a sectional view schematically representing a structure of the robot 100.

As shown in FIG. 3, the body 104 of the robot 100 includes a base frame 308, a main body frame 310, a pair of wheel covers 312 made of resin, and an outer skin 314. The base frame 308 is formed of metal, and supports an internal mechanism together with configuring a shaft of the body 104. The base frame 308 is configured by an upper plate 332 and a lower plate 334 being linked vertically by a multiple of side plates 336. A sufficient interval is provided between the multiple of side plates 336 so that ventilation is possible. A battery 118, a control circuit 342, and various kinds of actuator are housed inside the base frame 308.

The main body frame 310 is formed of a resin material, and includes a head portion frame 316 and a trunk portion frame 318. The head portion frame 316 is of a hollow hemispherical form, and forms a head portion framework of the robot 100. The trunk portion frame 318 is of a stepped cylindrical form, and forms a trunk portion framework of the robot 100. The trunk portion frame 318 is integrally fixed to the base frame 308. The head portion frame 316 is attached to an upper end portion of the trunk portion frame 318 so as to be relatively displaceable.

Three shafts, those being a yaw shaft 320, a pitch shaft 322, and a roll shaft 324, and an actuator 326 for driving each shaft so as to rotate, are provided in the head portion frame 316. The actuator 326 includes a multiple of servo motors for driving each shaft individually. The yaw shaft 320 is driven for a head shaking action, the pitch shaft 322 is driven for a nodding action, and the roll shaft 324 is driven for a head tilting action.

A plate 325 that supports the yaw shaft 320 is fixed to an upper portion of the head portion frame 316. A multiple of ventilation holes 327 for securing ventilation between upper and lower portions are formed in the plate 325.

A base plate 328 made of metal is provided so as to support the head portion frame 316 and an internal mechanism thereof from below. The base plate 328 is linked to the plate 325 via a crosslink mechanism 329 (a pantagraph mechanism), and is linked to the upper plate 332 (the base frame 308) via a joint 330.

The trunk portion frame 318 houses the base frame 308 and a wheel drive mechanism 370. The wheel drive mechanism 370 includes a pivot shaft 378 and an actuator 379. A lower half portion of the trunk portion frame 318 is of a small width in order to form a housing space S of the front wheel 102 between the wheel covers 312.

The outer skin 314 is formed of urethane rubber, and covers the main body frame 310 and the wheel covers 312 from an outer side. The arms 106 are molded integrally with the outer skin 314. An aperture portion 390 for introducing external air is provided in an upper end portion of the outer skin 314.

Figure 4:
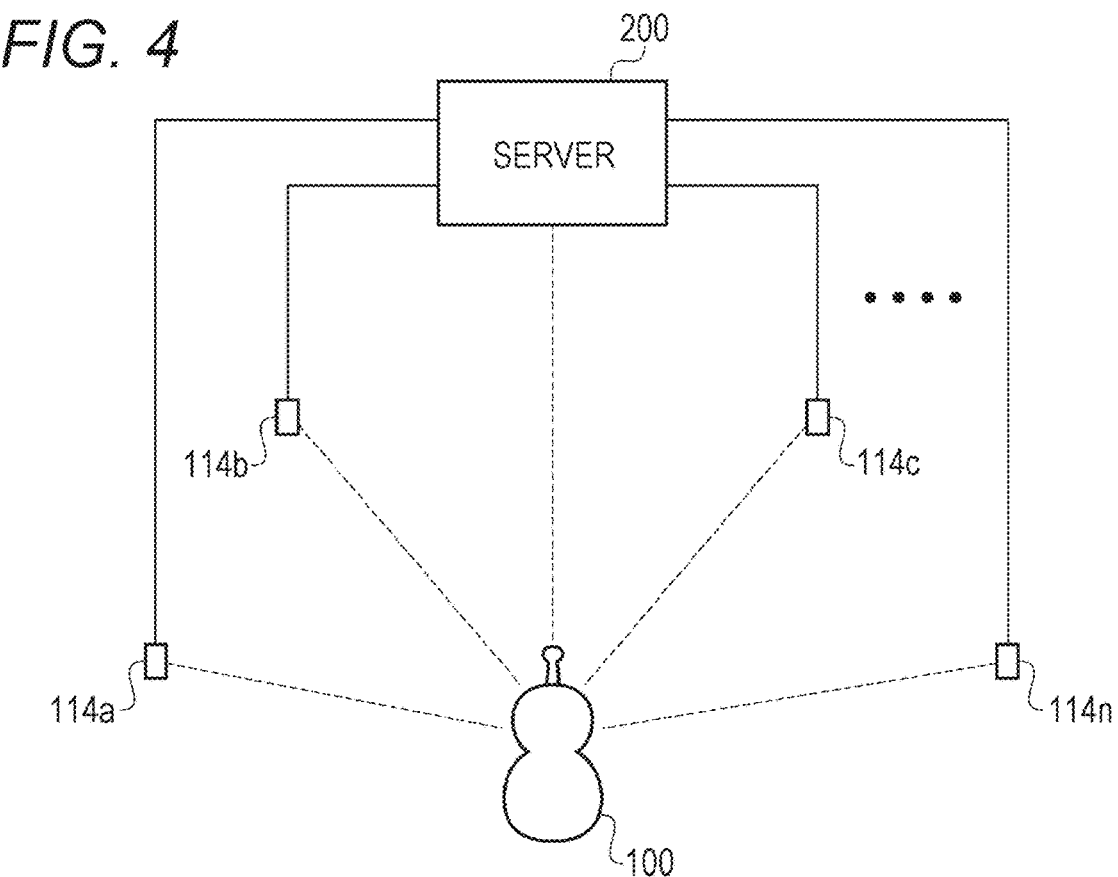
FIG. 4 is a configuration diagram of a robot system.

FIG. 4 is a configuration diagram of a robot system 300. The robot system 300 includes the robot 100, the server 200, and a multiple of external sensors 114. The multiple of external sensors 114 (external sensors 114a, 114b, and so on to 114n) are installed in advance in a house. The external sensor 114 may be fixed to a wall surface of the house, or may be placed on a floor. Positional coordinates of the external sensor 114 are registered in the server 200. The positional coordinates are defined as x, y coordinates in the house envisaged to be an action range of the robot 100.

The server 200 is installed in the house. The server 200 and the robot 100 in this embodiment correspond one-to-one. The server 200 determines a basic action of the robot 100 based on information obtained from the sensors incorporated in the robot 100 and the multiple of external sensors 114.

The external sensor 114 is for reinforcing sensory organs of the robot 100, and the server 200 is for reinforcing brainpower of the robot 100.

The external sensor 114 regularly transmits a wireless signal (hereafter called a "robot search signal") including ID (hereafter called "beacon ID") of the external sensor 114. On receiving the robot search signal, the robot 100 returns a wireless signal (hereafter called a "robot response signal")

including beacon ID. The server 200 measures a time from the external sensor 114 transmitting the robot search signal until receiving the robot response signal, and measures a distance from the external sensor 114 to the robot 100. By measuring the distance between each of the multiple of external sensors 114 and the robot 100, the server 200 identifies the positional coordinates of the robot 100.

Of course, a method whereby the robot 100 regularly transmits its own positional coordinates to the server 200 may also be adopted.

Figure 5:
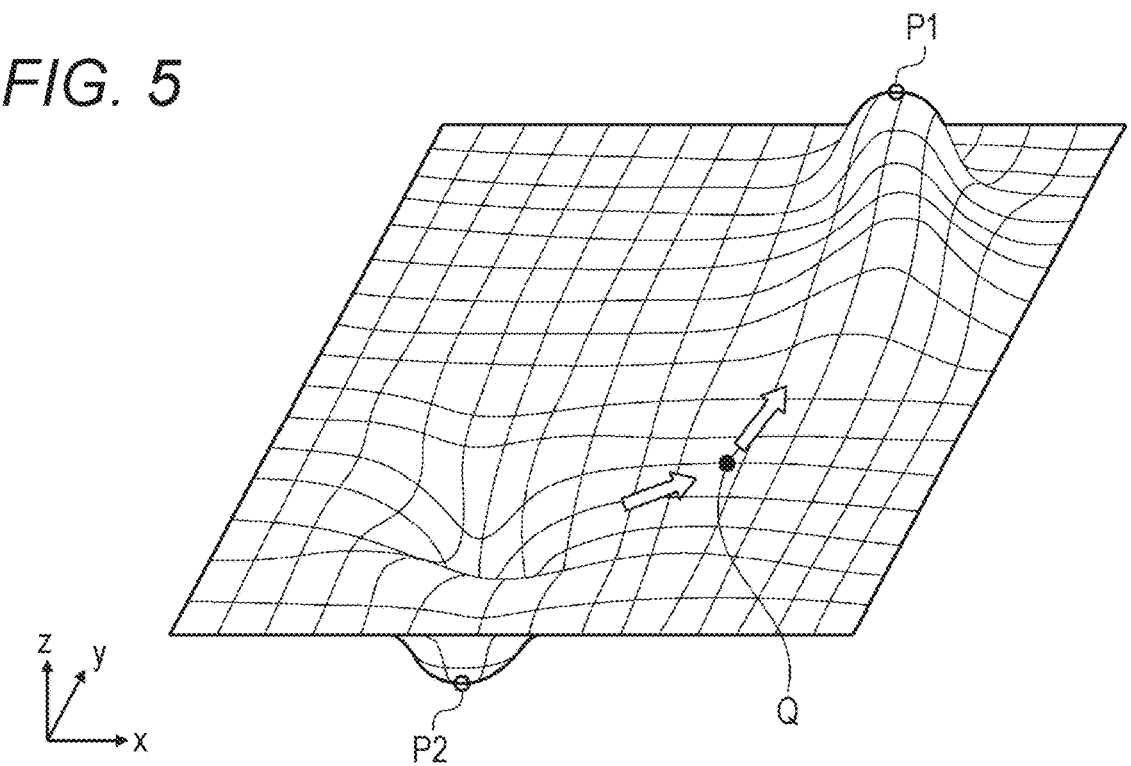
FIG. 5 is a schematic view of an emotion map.

FIG. 5 is a schematic view of an emotion map 116.

The emotion map 116 is a data table stored in the server 200. The robot 100 selects an action in accordance with the emotion map 116. The emotion map 116 shown in FIG. 5 shows a magnitude of an emotional attachment or aversion to a place of the robot 100. An x axis and a y axis of the emotion map 116 indicate two-dimensional spatial coordinates. A z axis indicates a magnitude of an emotional attachment or aversion. When a z value is a positive value, an attachment to the place is high, and when the z value is a negative value, the robot 100 is averse to the place.

On the emotion map 116 of FIG. 5, a coordinate P1 is a point in an indoor space managed by the server 200 as the action range of the robot 100 at which an emotion of attraction is high (hereafter called a favored point). The favored point may be a "safe place", such as behind a sofa or under a table, or may be a place in which people tend to gather or a lively place, like a living room. Also, the safe place may be a place where the robot 100 has been gently stroked or touched in the past.

A definition of what kind of place the robot 100 favors is arbitrary, but it is generally desirable that a place favored by small children, or by small animals such as dogs or cats, is set as a favored point.

A coordinate P2 is a point at which an emotion of aversion is high (hereafter called a "disliked point"). The disliked point may be a place where there is a loud noise, such as near a television, a place where there is likely to be a leak, like a bathroom or a washroom, an enclosed space or a dark place, a place where the robot 100 has been roughly treated by a user and that invokes an unpleasant memory, or the like.

A definition of what kind of place the robot 100 dislikes is also arbitrary, but it is generally desirable that a place feared by small children, or by small animals such as dogs or cats, is set as a disliked point.

A coordinate Q indicates a current position of the robot 100. The server 200 identifies positional coordinates of the robot 100, using the robot search signal regularly transmitted by the multiple of external sensors 114 and the robot response signal responding to the robot search signal. For example, when the external sensor 114 with beacon ID=1 and the external sensor 114 with beacon ID=2 each detect the robot 100, the server 200 obtains the distances of the robot 100 from the two external sensors 114, and obtains the positional coordinates of the robot 100 from the distances.

Alternatively, the external sensor 114 with beacon ID=1 transmits the robot search signal in a multiple of directions, and the robot 100 returns the robot response signal when receiving the robot search signal. By so doing, the server 200 may ascertain in which direction, and at what distance, the robot 100 is from which external sensor 114. Also, in another embodiment, the server 200 may calculate a distance moved by the robot 100 from the rotational speed of the front wheel 102 or the rear wheel 103, thereby identifying the current position, or may identify the current position based on an image obtained from the camera.

When the emotion map 116 shown in FIG. 5 is provided, the robot 100 moves in a direction toward the favored point (coordinate P1), or in a direction away from the disliked point (coordinate P2).

The emotion map 116 changes dynamically. When the robot 100 arrives at the coordinate P1, the z value (emotion of attraction) at the coordinate P1 decreases with the passing of time. Because of this, the robot 100 can emulate animal-like behavior of arriving at the favored point (coordinate P1), "being emotionally satisfied", and in time "getting bored" with the place. In the same way, the emotion of aversion at the coordinate P2 is alleviated with the passing of time. A new favored point or disliked point appears together with the elapse of time, because of which the robot 100 carries out a new action selection. The robot 100 has "interest" in a new favored point, and ceaselessly carries out a new action selection.

The emotion map 116 expresses emotional swings as an internal state of the robot 100. The robot 100 heads for a favored point, avoids a disliked point, stays for a while at the favored point, and in time performs the next action. With this kind of control, the action selection of the robot 100 can be a human-like or animal-like action selection.

Maps that affect an action of the robot 100 (hereafter collectively called "action maps") are not limited to the type of emotion map 116 shown in FIG. 5. For example, various action maps such as curiosity, a desire to avoid fear, a desire to seek security, and a desire to seek physical ease such as quietude, low light, coolness, or warmth, can be defined. Further, an objective point of the robot 100 may be determined by taking a weighted average of the z values of each of a multiple of action maps.

The robot 100 may also have, in addition to an action map, parameters that indicate a magnitude of various emotions or senses. For example, when a value of a loneliness emotion parameter is increasing, a weighting coefficient of an action map that evaluates places in which the robot 100 feels at ease may be set high, and the value of this emotion parameter reduced by the robot 100 reaching a target point. In the same way, when a value of a parameter indicating a sense of boredom is increasing, it is sufficient that a weighting coefficient of an action map that evaluates places in which curiosity is satisfied is set high.

Figure 6:
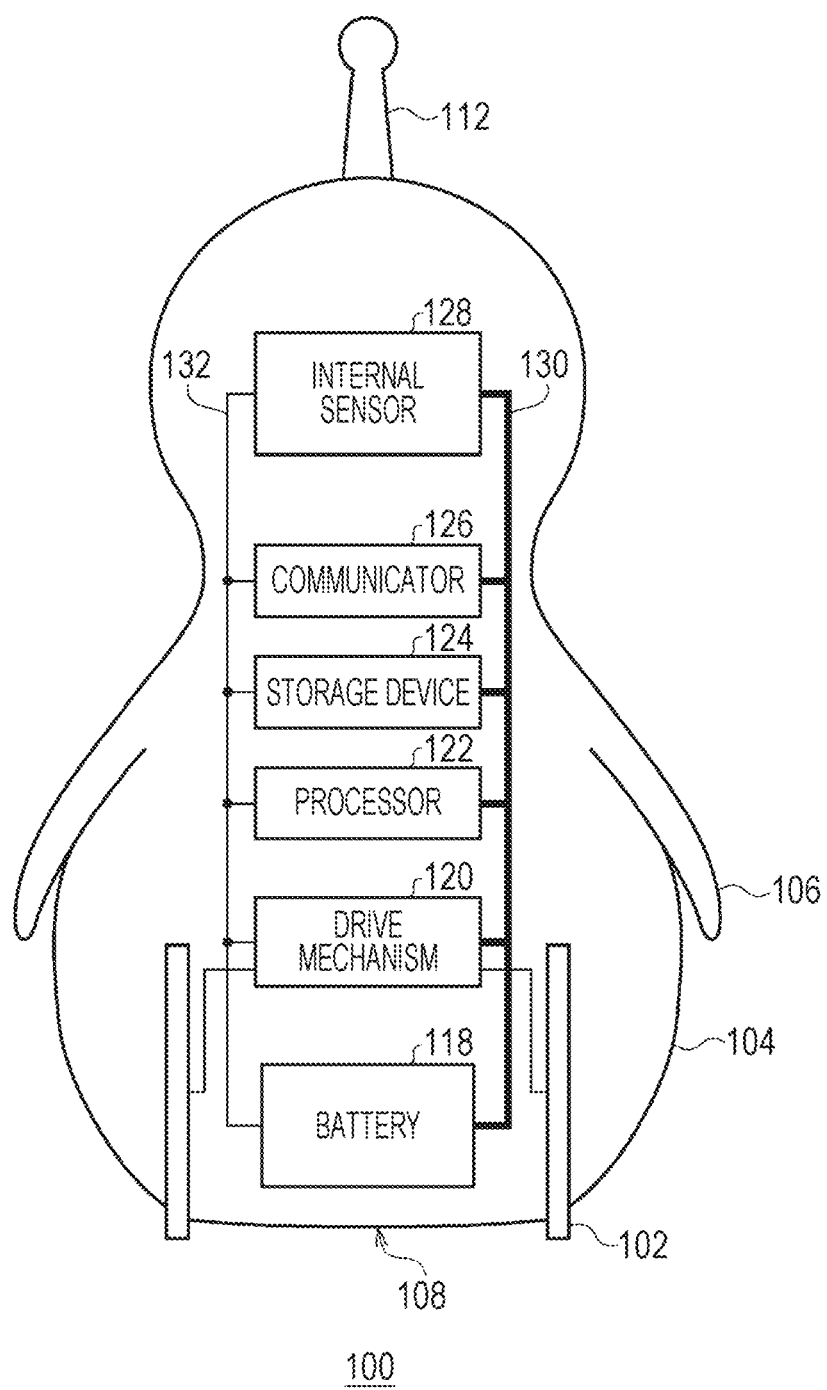
FIG. 6 is a hardware configuration diagram of the robot.

FIG. 6 is a hardware configuration diagram of the robot 100.

The robot 100 includes an internal sensor 128, a communicator 126, a storage device 124, a processor 122, a drive mechanism 120, and the battery 118. The drive mechanism 120 includes the heretofore described wheel drive mechanism 370. The processor 122 and the storage device 124 are included in the control circuit 342. The units are connected to each other by a power line 130 and a signal line 132. The battery 118 supplies power to each unit via the power line 130. Each unit transmits and receives a control signal via the signal line 132. The battery 118 is a lithium ion rechargeable battery, and is a power source of the robot 100.

The internal sensor 128 is a collection of various kinds of sensor incorporated in the robot 100. Specifically, the internal sensor 128 is a camera, a highly directional microphone, an infrared sensor, a thermosensor, a touch sensor, an acceleration sensor, a smell sensor, and the like. The smell sensor is an already known sensor that applies a principle that electrical resistance changes in accordance with an adsorption of a molecule forming a source of a smell. The smell sensor classifies various smells into multiple kinds of category (hereafter called "smell categories").

The communicator 126 is a communication module that carries out wireless communication with the server 200 and various kinds of external device, such as the external sensor 114 and a mobile device possessed by a user, as a target. The storage device 124 is configured of a non-volatile memory and a volatile memory, and stores a computer program and various kinds of setting information. The processor 122 is means of executing a computer program. The drive mechanism 120 is an actuator that controls an internal mechanism. In addition to this, an indicator, a speaker, and the like are also mounted.

The processor 122 selects an action of the robot 100 while communicating with the server 200 or the external sensor 114 via the communicator 126. Various kinds of external information obtained by the internal sensor 128 also affect the action selection. The drive mechanism 120 mainly controls the wheels (front wheels 102) and the head portion (the head portion frame 316). The drive mechanism 120 changes a direction of movement and a movement speed of the robot 100 by changing the rotational speed and the direction of rotation of each of the two front wheels 102. Also, the drive mechanism 120 can also raise and lower the wheels (the front wheels 102 and the rear wheel 103). When the wheels rise, the wheels are completely stored in the body 104, and the robot 100 comes into contact with the floor surface F via the seating face 108, taking on the sitting state.

Figure 7:
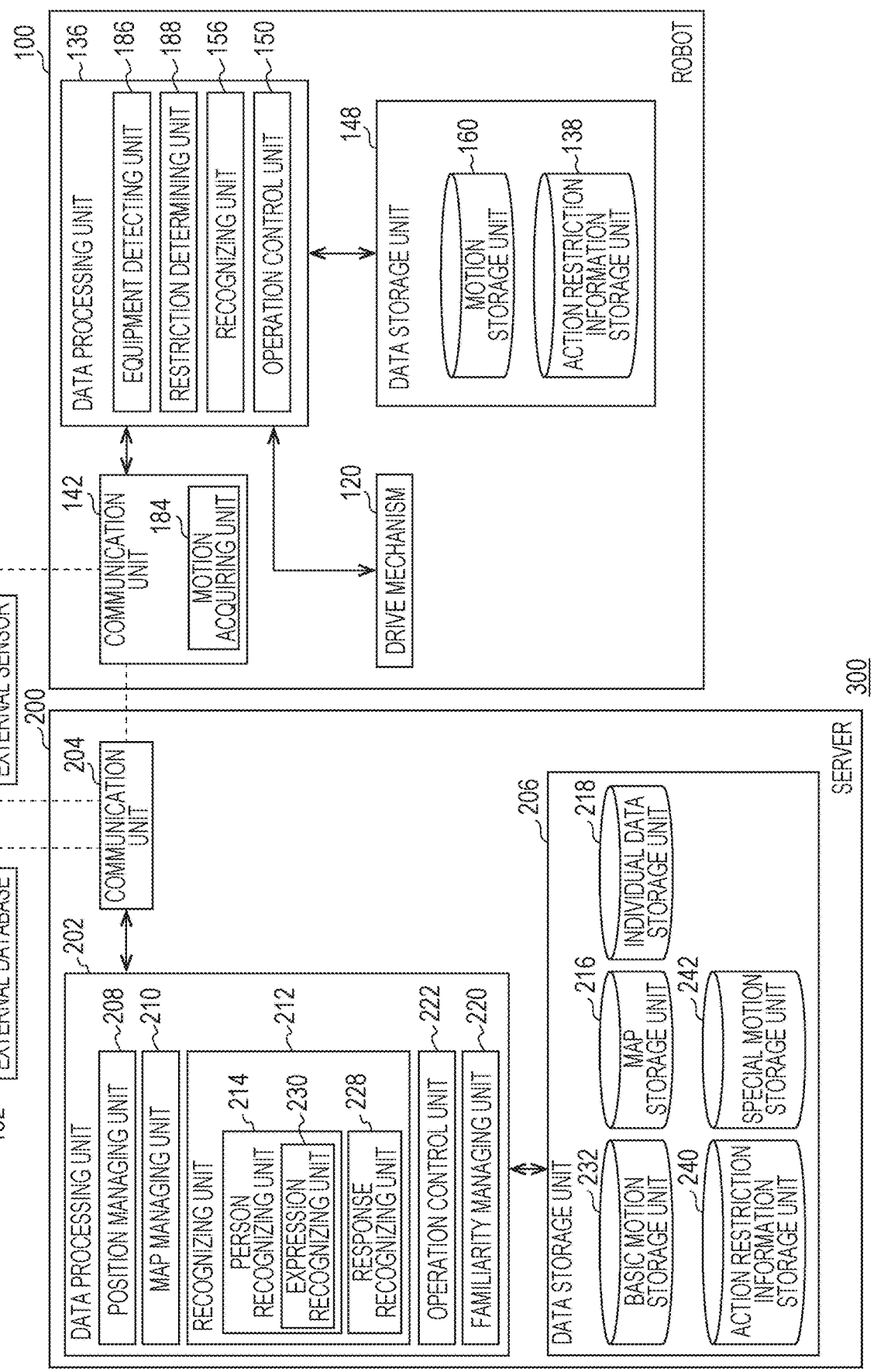
FIG. 7 is a functional block diagram of the robot system.

FIG. 7 is a functional block diagram of the robot system 300.

As heretofore described, the robot system 300 includes the robot 100, the server 200, and the multiple of external sensors 114. Each component of the robot 100 and the server 200 is realized by hardware including a computer formed of a CPU (central processing unit), various kinds of coprocessor, and the like, a storage device that is a memory or storage, and a wired or wireless communication line that links the computer and the storage device, and software that is stored in the storage device and supplies a processing command to the computer. A computer program may be configured of a device driver, an operating system, various kinds of application program positioned in an upper layer thereof, and a library that provides a common function to the programs. Each block described hereafter indicates a functional unit block rather than a hardware unit configuration.

One portion of the functions of the robot 100 may be realized by the server 200, and one portion or all of the functions of the server 200 may be realized by the robot 100.

Server 200

The server 200 includes a communication unit 204, a data processing unit 202, and a data storage unit 206.

The communication unit 204 manages a process of communicating with the external sensor 114, the external database 182 and the robot 100. The data storage unit 206 stores various kinds of data. The data processing unit 202 executes various kinds of process based on data acquired by the communication unit 204 and data stored in the data storage unit 206. The data processing unit 202 also functions as an interface of the communication unit 204 and the data storage unit 206.

The external database 182 stores clothing attribute information. Clothing attribute information in this embodiment includes two kinds, those being (1) action restriction information and (2) a special motion. Action restriction information is information indicating a strength with which clothing regulates movement of the robot 100, particularly movement of the various kinds of actuator. A special motion is a specific operation correlated to clothing and peculiar to the clothing. Details of these will be described hereafter.

The data storage unit 206 includes a basic motion storage unit 232, a map storage unit 216, an individual data storage unit 218, an action restriction information storage unit 240, and a special motion storage unit 242.

The robot 100 has various operation patterns (motions). Various motions, such as waving an arm, approaching an owner while winding, and watching an owner closely with the head tilted, are defined. Motions include a "basic motion" initially set in the robot 100 and a peculiar "special motion" correlated to clothing when the robot 100 wears the clothing.

The basic motion storage unit 232 stores a motion file defining basic motion control details. The special motion storage unit 242 holds a motion file of a peculiar special motion correlated to clothing ID and clothing. When clothing is worn in layers, a special motion corresponding to a combination of multiple items of clothing may be prepared (details to be described hereafter). Each motion is identified by motion ID. The special motion storage unit 242 will be described hereafter in connection with FIG. 11. Motion files of a basic motion and a special motion are downloaded into a motion storage unit 160 of the robot 100. Which motion is to be executed may be determined by the server 200, or may be determined by the robot 100.

Many motions of the robot 100 are configured as compound motions that include a multiple of unit motions. For example, when the robot 100 approaches an owner, the approach may be expressed as a combination of a unit motion of changing direction to face the owner, a unit motion of approaching while raising an arm, a unit motion of approaching while shaking the body, and a unit motion of sitting while raising both arms. By combining these kinds of four motions, a motion of "approaching an owner, raising one arm on the way, and finally sitting after shaking the body" is realized. An angle of rotation, angular velocity, and the like of an actuator provided in the robot 100 is defined correlated to a time axis in a motion file. Various motions are performed by each actuator being controlled together with the passing of time in accordance with the motion file (actuator control information).

A shift time when changing from a preceding unit motion to a subsequent unit motion is called an "interval". It is sufficient that an interval is defined in accordance with time needed for a unit motion change or details of a motion. A length of an interval can be regulated.

Hereafter, settings relating to controlling behavior of the robot 100, such as which motion is chosen and when, and regulating output of each actuator when a motion is realized, will collectively be called "behavioral characteristics".

The map storage unit 216 stores a multiple of action maps. The individual data storage unit 218 stores information on a user, and in particular, on an owner. Specifically, the individual data storage unit 218 stores various kinds of parameter, such as familiarity with respect to a user, and physical characteristics and behavioral characteristics of a user. The individual data storage unit 218 may also store other attribute information such as age and gender. The action restriction information storage unit 240 correlates action restriction information, which is information indicating an extent to which clothing restricts an action of the robot 100, to clothing ID. The action restriction information storage unit 240 will be described hereafter in connection with FIG. 9. Action restriction information is also downloaded into the robot 100, and stored in an action restriction information storage unit 138.

The robot 100 identifies a user based on the user's physical characteristics or behavioral characteristics. The robot 100 constantly films a periphery using the incorporated camera. Further, the robot 100 extracts the physical characteristics and behavioral characteristics of a person appearing in an image. The physical characteristics may be visual characteristics inherent to a body, such as a height, clothes worn by choice, a presence or absence of spectacles, a skin color, a hair color, or an ear size, or may also include other characteristics such as an average body temperature, a smell, and a voice quality. The behavioral characteristics, specifically, are characteristics accompanying behavior, such as a place the user favors, a briskness of movement, and a presence or absence of smoking. For example, the robot 100 extracts behavioral characteristics such that an owner identified as a father is often out of the home, and is often motionless on a sofa when at home, but a mother is often in a kitchen, and an activity range is broad.

The robot 100 clusters users appearing with a high frequency as "owners" based on physical characteristics and behavioral characteristics obtained from a large amount of image information or other sensing information.

Although the method of identifying a user from user ID is simple and reliable, the user having a device that can provide user ID is a precondition. Meanwhile, the method of identifying a user from physical characteristics or behavioral characteristics is such that an image recognition process is weighty, but there is an advantage in that even a user who does not have a mobile device can be identified. One of the two methods may be employed alone, or user identification may be carried out using the two methods together in a complementary way.

In this embodiment, users are clustered based on physical characteristics and behavioral characteristics, and a user is identified using deep learning (a multilayer neural network). Details will be described hereafter.

The robot 100 has a familiarity internal parameter for each user. When the robot 100 recognizes an action indicating a liking toward the robot 100, such as picking the robot 100 up or speaking to the robot 100, familiarity with respect to that user increases. Familiarity decreases with respect to a user not involved with the robot 100, a user who behaves roughly, or a user met infrequently.

The data processing unit 202 includes a position managing unit 208, a map managing unit 210, a recognizing unit 212, an operation control unit 222, and a familiarity managing unit 220.

The position managing unit 208 identifies the positional coordinates of the robot 100 using the method described using FIG. 4. The position managing unit 208 may also track positional coordinates of a user in real time.

The map managing unit 210 changes the parameter of each coordinate on the multiple of action maps using the method described in connection with FIG. 5. The map managing unit 210 may select one of the multiple of action maps, or may take a weighted average of the z values of the multiple of action maps. For example, it is taken that the z values at a coordinate R1 and a coordinate R2 on an action map A are 4 and 3, and the z values at the coordinate R1 and the coordinate R2 on an action map B are −1 and 3. When taking a simple average, the total z value at the coordinate R1 is 4−1=3, and the total z value at the coordinate R2 is 3+3=6, because of which the robot 100 heads in the direction of the coordinate R2 rather than the coordinate R1.

When the action map A is weighted 5 times with respect to the action map B, the total z value at the coordinate R1 is 4×5−1=19, and the total z value at the coordinate R2 is 3×5+3=18, because of which the robot 100 heads in the direction of the coordinate R1.

The recognizing unit 212 recognizes an external environment. Various kinds of recognition, such as recognition of weather or season based on temperature and humidity, and recognition of shelter (a safe area) based on an amount of light and temperature, are included in the recognition of the external environment. The recognizing unit 212 further includes a person recognizing unit 214 and a response recognizing unit 228. The person recognizing unit 214 recognizes a person from an image filmed by the camera incorporated in the robot 100, and extracts the physical characteristics and behavioral characteristics of the person. Further, based on the physical characteristic information and behavioral characteristic information registered in the individual data storage unit 218, the person recognizing unit 214 determines what person, such as a father, a mother, or an eldest son, the user filmed, that is, the user the robot 100 is looking at, corresponds to. The person recognizing unit 214 includes an expression recognizing unit 230. The expression recognizing unit 230 infers an emotion of a user using image recognition of an expression of the user.

In addition to a person, the person recognizing unit 214 also, for example, extracts characteristics of a cat or a dog that is a pet.

The response recognizing unit 228 recognizes various responsive actions performed with respect to the robot 100, and classifies the actions as pleasant or unpleasant actions. Also, the response recognizing unit 228 recognizes a responsive action of an owner with respect to an action of the robot 100, thereby classifying the responsive action as a positive or negative response.

Pleasant and unpleasant actions are distinguished depending on whether a responsive action of a user is pleasing or unpleasant for an animal. For example, being hugged is a pleasant action for the robot 100, and being kicked is an unpleasant action for the robot 100. Positive and negative responses are distinguished depending on whether a responsive action of a user indicates a pleasant emotion or an unpleasant emotion of the user. For example, being hugged is a positive response indicating a pleasant emotion of the user, and being kicked is a negative response indicating an unpleasant emotion of the user.

The operation control unit 222 of the server 200 determines a motion of the robot 100 in cooperation with an operation control unit 150 of the robot 100. The operation control unit 222 of the server 200 compiles a movement target point of the robot 100, and a movement route for the movement target point, based on an action map selection by the map managing unit 210. The operation control unit 222 compiles a multiple of movement routes, and having done so, may select any of the movement routes. The operation control unit 222 selects a motion of the robot 100 from a multiple of basic motions of the basic motion storage unit 232 or a special motion of the special motion storage unit 242. A selection probability is correlated to each motion for each situation. For example, a selection method such that a motion A is executed with a 20% probability when a pleasant action is performed by an owner, and a motion B is executed with a 5% probability when a temperature reaches 30 degrees or higher, is defined.

The familiarity managing unit 220 manages familiarity for each user. As heretofore described, familiarity is registered as one portion of individual data in the individual data storage unit 218. When a pleasant action is detected, the familiarity managing unit 220 increases familiarity with respect to that user. When an unpleasant action is detected, the familiarity managing unit 220 reduces familiarity. Also, familiarity of an owner who has not been visually recognized for a long period gradually decreases.

Robot 100

The robot 100 includes a communication unit 142, a data processing unit 136, a data storage unit 148, and a drive mechanism 120.

The communication unit 142 corresponds to the communicator 126 (refer to FIG. 6), and manages a process of communicating with the external sensor 114 and the server 200. The data storage unit 148 stores various kinds of data. The data storage unit 148 corresponds to the storage device 124 (refer to FIG. 6). The data processing unit 136 executes various kinds of process based on data acquired by the communication unit 142 and data stored in the data storage unit 148. The data processing unit 136 corresponds to the processor 122 and a computer program executed by the processor 122. The data processing unit 136 also functions as an interface of the communication unit 142, the internal sensor 128, the drive mechanism 120, and the data storage unit 148.

The data storage unit 148 includes the motion storage unit 160, which defines various kinds of motion of the robot 100, and the action restriction information storage unit 138.

A motion file into which various kinds of motion file are downloaded from the basic motion storage unit 232 and the special motion storage unit 242 of the server 200 is stored in the motion storage unit 160 of the robot 100. A motion is identified by motion ID. An operating timing, an operating time, an operating direction, and the like, of the various kinds of actuator (the drive mechanism 120) are defined chronologically in the motion file in order to perform various motions such as sitting by housing the front wheels 102, raising the arm 106, causing the robot 100 to carry out a rotating action by causing the two front wheels 102 to rotate in reverse or by causing only one front wheel 102 to rotate, shaking by causing the front wheels 102 to rotate in a state in which the front wheels 102 are housed, or stopping once and looking back when moving away from a user.

The action restriction information storage unit 138, in the same way as the action restriction information storage unit 240 of the server 200, stores clothing action restriction information.

The communication unit 142 includes a motion acquiring unit 184. When clothing ID is detected, that is, when a wearing of clothing is detected, the motion acquiring unit 184 acquires clothing attribute information (action restriction information and a special motion) corresponding to the clothing ID from the server 200. When the server 200 does not have the clothing attribute information of the clothing worn by the robot 100, the server 200 downloads the clothing attribute information by making an enquiry to the external database 182.

The data processing unit 136 includes an equipment detecting unit 186, a restriction determining unit 188, a recognizing unit 156, and the operation control unit 150.

The operation control unit 150 of the robot 100 determines a motion of the robot 100 in cooperation with the operation control unit 222 of the server 200. One portion of motions may be determined by the server 200, and other motions may be determined by the robot 100. Also, even though the robot 100 determines a motion, the server 200 may determine the motion when a processing load of the robot 100 is high. A motion forming a base may be determined in the server 200, and an additional motion determined in the robot 100. It is sufficient that how a motion determining process is divided between the server 200 and the robot 100 is designed in accordance with specifications of the robot system 300.

The operation control unit 150 of the robot 100 determines a direction of movement of the robot 100 together with the operation control unit 222 of the server 200. Movement based on an action map may be determined by the server 200, and an immediate movement such as avoiding an obstacle may be determined by the operation control unit 150 of the robot 100. The drive mechanism 120 causes the robot 100 to head toward a movement target point by driving the front wheels 102 in accordance with an instruction from the operation control unit 150.

Although it is an action map that determines the main element of the direction of movement of the robot 100, the robot 100 can also carry out an action in accordance with familiarity.

The operation control unit 150 of the robot 100 instructs the drive mechanism 120 to execute a selected motion. The drive mechanism 120 controls each actuator in accordance with the motion file.

The operation control unit 150 can also execute a motion of holding up both arms 106 as a gesture asking for "a hug" when a user with a high degree of familiarity is nearby, and can also perform a motion of no longer wanting to be hugged by alternately and repeatedly causing the right and left front wheels 102 to rotate in reverse and stop in a housed state when bored of the "hug". The drive mechanism 120 causes the robot 100 to perform various motions by driving the front wheels 102, the arm 106, and the neck (the head unit frame 316) in accordance with an instruction from the operation control unit 150.

When reading clothing ID from the RFID tag embedded in the clothing 180, the equipment detecting unit 186 determines that the clothing 180 has been put on. The clothing ID can be read when at close range. When a multiple of clothing IDs are read, it is determined that clothing is being worn in layers. When clothing attribute information corresponding to the clothing ID already exists in the motion storage unit 160, the operation control unit 150 changes an operation setting in accordance with the clothing attribute information, using a method to be described hereafter.

In addition to an RFID tag, the equipment detecting unit 186 may detect that clothing has been put on using various methods. For example, the equipment detecting unit 186 may determine that clothing has been put on when an internal temperature of the robot 100 rises. Clothing put on may be recognized from an image using the camera. A capacitive sensor may be installed over a wide range of the outer skin 314, and the equipment detecting unit 186 may determine that clothing has been put on when the capacitive sensor detects a touch over a wide range. Hereafter, detecting that clothing has been put on based on physical information such as image information, temperature information, or tactile information, rather than an RFID tag, will be called "physical recognition".

An owner may want to dress 100 in clothing that does not have clothing ID, for example, clothing made by the owner. Hereafter, clothing for which clothing ID is registered using an RFID tag will be called "official clothing", and clothing for which no clothing ID is registered using an RFID tag will be called "unofficial clothing". When not particularly differentiating, clothing will simply be called "clothing".

When there is no clothing attribute information corresponding to clothing ID in the motion storage unit 160, the motion acquiring unit 184 transmits the clothing ID to the server 200, and downloads clothing attribute information (a motion file and action restriction information). When there is no clothing attribute information in the server 200 either, the server 200 downloads clothing attribute information from the external database 182. When there is no clothing attribute information in the external database 182 either, the clothing is treated as unofficial clothing.

The restriction determining unit 188 determines an action restrictiveness of clothing based on action restriction information among clothing attribute information. The operation control unit 150 corrects an operation of the robot 100 based on a result of the determination. In a case of unofficial clothing, the operation control unit 150 measures output applied to each actuator, and an operating amount thereof, and records the measurements as operation data. The restriction determining unit 188 determines action restrictiveness based on the operation data.

The recognizing unit 156 analyzes external information obtained from the internal sensor 128. The recognizing unit 156 is capable of visual recognition (a visual unit), smell recognition (an olfactory unit), sound recognition (an aural unit), and tactile recognition (a tactile unit).

The recognizing unit 156 regularly films an exterior angle using the incorporated camera (the internal sensor 128), and detects a moving object such as a person or a pet. Characteristics thereof are transmitted to the server 200, and the person recognizing unit 214 of the server 200 extracts the physical characteristics of the moving object. Also, the recognizing unit 156 also detects a smell of the user and a voice of the user. Smell and sound (voice) are classified into multiple kinds using an already known method.

When a strong force is applied to the robot 100, the recognizing unit 156 recognizes this using an incorporated acceleration sensor, and the response recognizing unit 228 of the server 200 recognizes that a "violent action" has been performed by a user in the vicinity. When a user picks the robot 100 up by grabbing the horn 112, this may also be recognized as a violent action. When a user in a state of confronting the robot 100 speaks in a specific volume region and a specific frequency band, the response recognizing unit 228 of the server 200 may recognize that a "speaking action" has been performed with respect to the robot 100. Also, when a temperature in the region of body temperature is detected, the response recognizing unit 228 of the server 200 recognizes that a "touching action" has been performed by a user, and when upward acceleration is detected in a state in which touching is recognized, the response recognizing unit 228 of the server 200 recognizes that a "hug" has been performed. Physical contact when a user raises the body 104 may also be sensed, and a hug may also be recognized by a load acting on the front wheels 102 decreasing.

The response recognizing unit 228 of the server 200 recognizes various kinds of response by a user toward the robot 100. "Pleasant" or "unpleasant", "positive" or "negative" is correlated to one portion of typical responsive actions among various kinds of responsive action. In general, almost all responsive actions that are pleasant actions are positive responses, and almost all responsive actions that are unpleasant actions are negative responses. Pleasant and unpleasant actions relate to familiarity, and positive and negative responses affect action selection of the robot 100.

A series of recognition processes including detecting, analyzing, and determining may be carried out by the recognizing unit 212 of the server 200 alone, or carried out by the recognizing unit 156 of the robot 100 alone, or the two may execute the recognition processes while dividing roles.

The familiarity managing unit 220 of the server 200 changes the familiarity toward a user in accordance with a responsive action recognized by the recognizing unit 156. Essentially, the familiarity toward a user who carries out a pleasant action increases, while the familiarity toward a user who carries out an unpleasant action decreases.

The recognizing unit 212 of the server 200 may determine whether a response is pleasant or unpleasant, and the map managing unit 210 of the server 200 may change the z value of the point at which the pleasant or unpleasant action has been carried out on an action map that represents "attachment to a place". For example, when a pleasant action is carried out in a living room, the map managing unit 210 may set a favored point at a high probability in the living room. In this case, a positive feedback advantage is realized in that the robot 100 favors the living room, and further favors the living room due to being the recipient of a pleasant action in the living room.

The person recognizing unit 214 of the server 200 detects a moving object from various kinds of data obtained from the external sensor 114 or the internal sensor 128, and extracts characteristics (physical characteristics and behavioral characteristics) thereof. Further, the person recognizing unit 214 cluster analyzes multiple moving objects based on these characteristics. Not only a human, but also a pet such as a dog or cat, may be a target of analysis as a moving object.

The robot 100 regularly carries out image filming, and the person recognizing unit 214 recognizes a moving object from the images, and extracts characteristics of the moving object. When a moving object is detected, physical characteristics and behavioral characteristics are also extracted from the smell sensor, the incorporated highly directional microphone, the temperature sensor, and the like. For example, when a moving object appears in an image, various characteristics are extracted, such as having a beard, being active early in the morning, wearing red clothing, smelling of perfume, having a loud voice, wearing spectacles, wearing a skirt, having white hair, being tall, being plump, being suntanned, or being on a sofa.

When a moving object (user) having a beard is often active early in the morning (gets up early) and rarely wears red clothing, a first profile that is a cluster (user) that gets up early, has a beard, and does not often wear red clothing is created. Meanwhile, when a moving object wearing spectacles often wears a skirt, but the moving object does not have a beard, a second profile that is a cluster (user) that wears spectacles and wears a skirt, but definitely does not have a beard, is created.

Although the above is a simple example, the first profile corresponding to a father and the second profile corresponding to a mother are formed using the heretofore described method, and the robot 100 recognizes that there at least two users (owners) in this house.

Note that the robot 100 does not need to recognize that the first profile is the "father". In all cases, it is sufficient that the robot 100 can recognize a figure that is "a cluster that has a beard, often gets up early, and hardly ever wears red clothing".

It is assumed that the robot 100 newly recognizes a moving object (user) in a state in which this kind of cluster analysis is completed.

At this time, the person recognizing unit 214 of the server 200 extracts characteristics from sensing information of an image or the like obtained from the robot 100, and determines which cluster a moving object near the robot 100 corresponds to using deep learning (a multilayer neural network). For example, when a moving object that has a beard is detected, the probability of the moving object being the father is high. When the moving object is active early in the morning, it is still more certain that the moving object corresponds to the father. Meanwhile, when a moving object that wears spectacles is detected, there is a possibility of the moving object being the mother. When the moving object has a beard, the moving object is neither the mother nor the father, because of which the person recognizing unit 214 determines that the moving object is a new person who has not been cluster analyzed.

Formation of a cluster by characteristic extraction (cluster analysis) and application to a cluster accompanying characteristic extraction (deep learning) may be executed concurrently.

Familiarity toward a moving object (user) changes in accordance with how the robot 100 is treated by the user.

The robot 100 sets a high familiarity for a frequently met person, a person who frequently touches the robot 100, and a person who frequently speaks to the robot 100. Meanwhile, familiarity decreases for a rarely seen person, a person who does not often touch the robot 100, a violent person, and a person who scolds in a loud voice. The robot 100 changes the familiarity of each user based on various items of exterior angle information detected by the sensors (visual, tactile, and aural).

The actual robot 100 autonomously carries out a complex action selection in accordance with an action map. The robot 100 acts while being affected by a multiple of action maps based on various parameters such as loneliness, boredom, and curiosity. When the effect of the action maps is removed, or when in an internal state in which the effect of the action maps is small, the robot 100 essentially attempts to approach a person with high familiarity, and attempts to move away from a person with low familiarity.

Actions of the robot 100 are classified below in accordance with familiarity.

(1) A cluster with extremely high familiarity

The robot 100 strongly expresses a feeling of affection by approaching a user (hereafter called "an approaching action"), and by performing an affectionate gesture defined in advance as a gesture indicating goodwill toward a person.

(2) A cluster with comparatively high familiarity

The robot 100 carries out only an approaching action.

(3) A cluster with comparatively low familiarity

The robot 100 does not carry out any special action.

(4) A cluster with particularly low familiarity

The robot 100 carries out a withdrawing action.

According to the heretofore described control method, the robot 100 approaches the user when finding a user with high familiarity, and conversely, moves away from the user when finding a user with low familiarity. According to this kind of control method, the robot 100 can express by behavior a so-called "shyness". Also, when a visitor (a user A with low familiarity) appears, the robot 100 may move away from the visitor and head toward a family member (a user B with high familiarity). In this case, user B can perceive that the robot 100 is shy and feeling uneasy, and relying on user B. Owing to this kind of behavioral expression, pleasure at being chosen and relied upon, and an accompanying feeling of affection, are evoked in user B.

Meanwhile, when user A, who is a visitor, visits frequently, and speaks to and touches the robot 100, familiarity of the robot 100 toward user A gradually rises, and the robot 100 ceases to perform an action of shyness (a withdrawing action) with respect to user A. User A can also feel affection toward the robot 100 by perceiving that the robot 100 has become accustomed to user A.

The heretofore described action selection need not necessarily be executed constantly. For example, when an internal parameter indicating curiosity of the robot 100 is high, weight is given to an action map from which a place in which the curiosity is satisfied is obtained, because of which there is also a possibility that the robot 100 does not select an action affected by familiarity. Also, when the external sensor 114 installed in the hall detects the return home of a user, the robot 100 may execute an action of greeting the user with maximum priority.

Figures 8, 9:
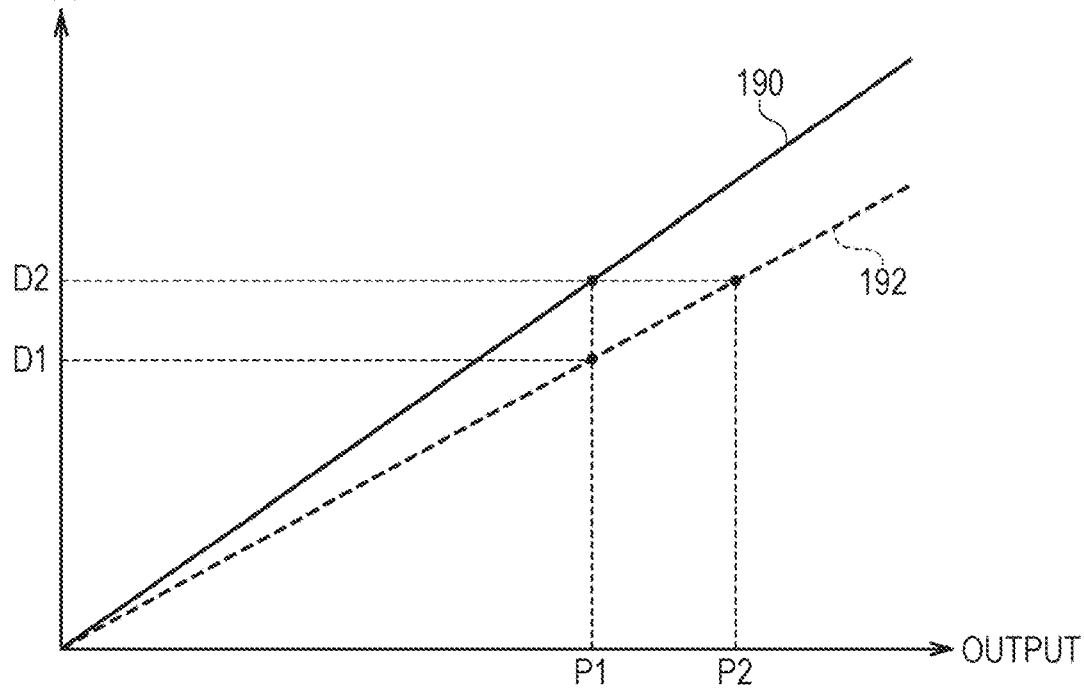
FIG. 8 is a diagram schematically showing a relationship between an output and an operating amount of an actuator.
FIG. 9 is a data structure diagram of an action restriction information storage unit.

FIG. 8 is a diagram schematically showing a relationship between an output and an operating amount of an actuator.

A horizontal axis shows an output value (output voltage) of an actuator, and a vertical axis shows an actual operating amount (amount of movement or amount of rotation) of the actuator. An unclothed characteristic 190 shows a characteristic when the robot 100 is not wearing the clothing 180. A clothed characteristic 192 shows a characteristic when the robot 100 is wearing the clothing 180. When unclothed, an operating amount corresponding to an output P1 is D2. As an operation of the robot 100 is restricted when wearing the clothing 180, the operating amount with respect to the output P1 is D1, which is less than D2.

In order to realize the operating amount D2 when the robot 100 is clothed, the output of the actuator needs to be set to P2, which is greater than P1. The magnitude of action restriction differs for each item of clothing 180. By the operation control unit 150 of the robot 100 regulating the output of each kind of actuator in accordance with the action restrictiveness of the clothing 180, an operating amount unchanged from that when unclothed is realized even when the clothing 180 is worn.

FIG. 9 is a data structure diagram of the action restriction information storage unit 240.

Clothing ID and clothing action restriction information are correlated in the action restriction information storage unit 240 of the server 200. As heretofore described, the robot 100 includes a multiple of actuators. For example, clothing with clothing ID=01 (hereafter expressed as "clothing (01)") has no effect at all on an operation of an actuator 1, but restricts an operation of an actuator 2 by 5%. To express in terms of FIG. 8, the operating amount D1 of the actuator 2 corresponds to 95% of D2. Consequently, when the clothing (01) is worn, the operation control unit 150 needs to change the setting of the output of the actuator 2 so as to be greater than when unclothed.

When the equipment detecting unit 186 detects clothing ID, the restriction determining unit 188 refers to the action restriction information, and determines the action restrictiveness of the clothing with respect to each actuator. The restriction determining unit 188 informs the operation control unit 150 of an output regulation value (correction value) for each actuator. In accordance with this, the operation control unit 150 carries out an output regulation, that is, an operation correction, for each actuator.

Clothing ID and category ID may be correlated in the action restriction information storage unit 240, and action restriction information correlated to each item of category ID. For example, common action restriction information may be set in a category corresponding to "summer wear". In this case, it is sufficient that the restriction determining unit 188 determines action restrictiveness from the category ID correlated to the clothing ID.

Figure 10:
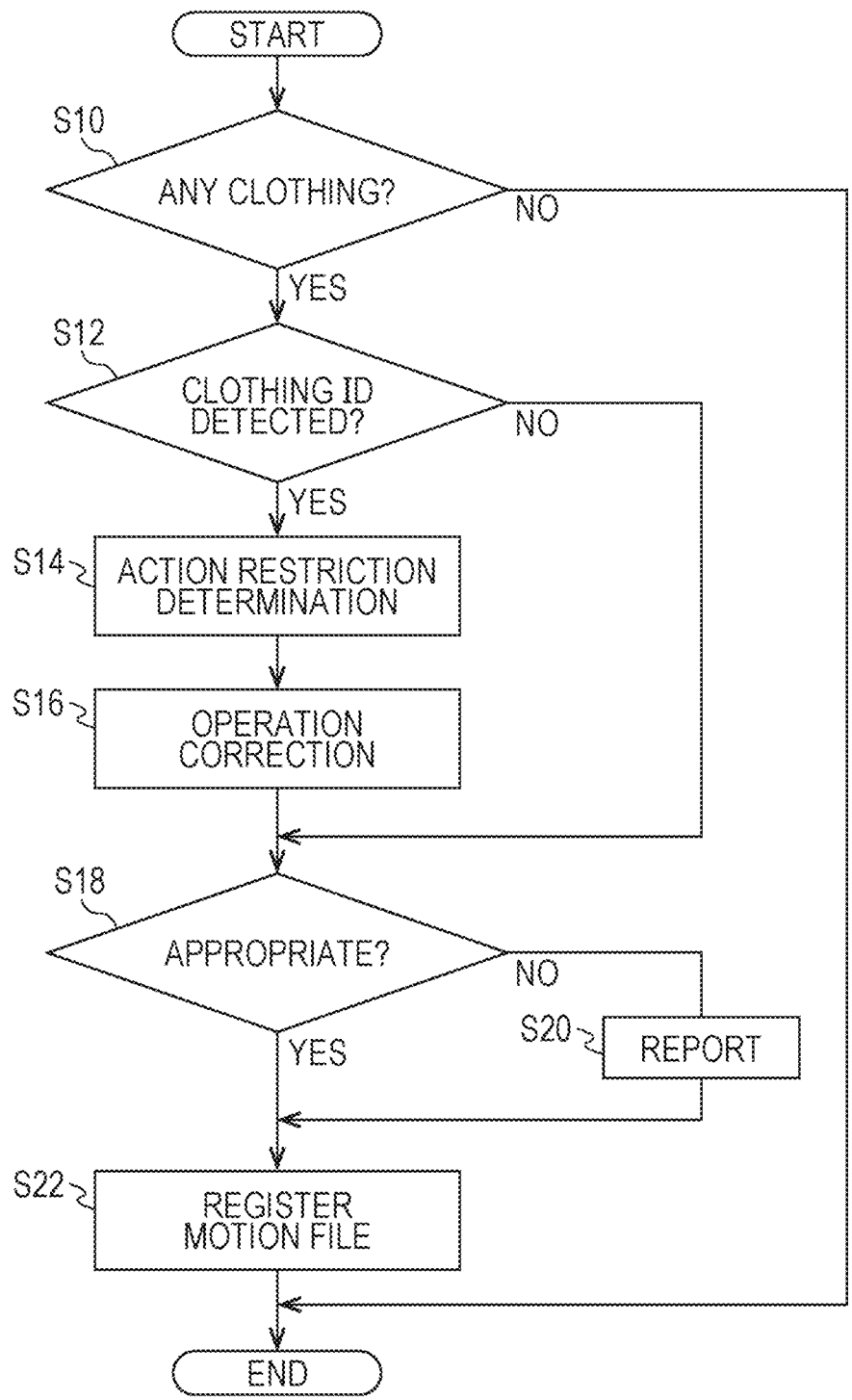
FIG. 10 is a flowchart indicating an operation correcting process when clothing is worn.

FIG. 10 is a flowchart indicating an operation correcting process when clothing is worn.

Firstly, the equipment detecting unit 186 physically recognizes that clothing is being worn based on physical information such as image information, temperature information, or tactile information (S10). When it cannot be physically recognized that clothing is being worn (N in S10), a subsequent process is not executed. When it can be physically recognized that clothing is being worn (Y in S10), the restriction determining unit 188 determines the action restrictiveness of the clothing (S14) when the equipment detecting unit 186 can also detect clothing ID (Y in S12), that is, when official clothing is being worn. When action restriction information is being saved in the action restriction information storage unit 138 of the robot 100, the restriction determining unit 188 determines the action restrictiveness based on this action restriction information. When no action restriction information is being saved in the action restriction information storage unit 138, the motion acquiring unit 184 acquires action restriction information from the server 200.

The operation control unit 150 of the robot 100 executes an operation correction based on the action restriction information (S16). Specifically, the operation control unit 150 changes the setting of the output of each actuator based on the action restriction information. After the operation correction, the operation control unit 150 actually operates each actuator, and measures the output value and the operating amount. The operation control unit 150 refers to operation data indicating a relationship between the output value and the operating amount, and determines whether or not a desired operating amount is being realized after the operation correction (S18).

When the desired operating amount is being realized owing to the operation correction of S16 (Y in S18), the operation control unit 150 further sets a special motion corresponding to the clothing ID (S22). When there is no motion file of a special motion in the motion storage unit 160 of the robot 100, the motion acquiring unit 184 acquires a motion file from the server 200.

Meanwhile, when the desired operating amount is not realized by the operation correction (N in S18), the robot 100 executes a report operation (S20). In this case, there is a possibility that although clothing ID has been detected, the robot 100 cannot move correctly because the clothing is not being worn correctly. A report operation is an operation that informs an owner of the matter that the robot 100 cannot move normally due to clothing being worn. Specifically, the operation control unit 150 executes a report operation such as causing the eye to light up, emitting speech, or shaking the body. It is sufficient that the report operation is initially set in advance as a "typical operation (motion) when telling you something" peculiar to the robot 100.

The report operation may also be expressed as a refusal operation. A refusal operation is an operation whereby the robot 100 refuses to wear the clothing 180. Specifically, the operation control unit 150 executes a refusal operation such as moving away from an owner, shaking the body violently, or not moving at all. It is sufficient that the refusal operation is initially set in advance as a "typical operation (motion), of operations when telling you something, particularly used when averse to something" peculiar to the robot 100.

Although movement of the robot 100 is restricted by clothing, the robot 100 can move in the same way when wearing clothing as when not wearing clothing by output regulation being carried out appropriately for each kind of actuator in accordance with the clothing.

When clothing ID cannot be detected (N in S12) although it can be physically recognized that clothing is being worn (Y in S10), that is, when unofficial clothing is being worn, the processes of S14 and S16 are skipped. In the case of unofficial clothing, it is sufficient that the operation control unit 150 records the output value and the operating amount of an actuator as operation data, and the restriction determining unit 188 determines the magnitude of action restriction of the unofficial clothing based on the operation data. The operation control unit 150 executes output regulation, that is, operation correction, for each actuator in accordance with a result of the determination.

When action restrictiveness is recognized despite a wearing of clothing not being physically recognizable, the equipment detecting unit 186 may film the body of the robot 100, and confirm whether clothing is being worn, or whether an object restricting action is adhering to the body, using image recognition. Further, an owner may be informed of a result of the confirmation using speech, communication, or a written display, or a peculiar report operation or the like.

FIG. 11 is a data structure diagram of the special motion storage unit 242.

Action details of the robot 100 may change in accordance with clothing. For example, when wearing certain clothing, the robot 100 may be rendered capable of executing a special motion peculiar to the clothing. Executing the same dance as an idol when a wearing a costume of the idol, sitting more slowly than usual when wearing Japanese-style clothing, moving around energetically when wearing sportswear, and the like, are conceivable as special motions.

A special motion may be a new, additional motion differing from a basic motion, or may be a basic motion adapted by regulating various kinds of setting of the basic motion.

As shown in FIG. 11, a "wearing condition" and an "actuating condition" are set for clothing. The wearing condition specifies a situation in which wearing the clothing is envisaged (an envisaged wearing state). The robot 100 recognizes wearing the clothing at a time that does not comply with the wearing condition as an unpleasant action. The "actuating condition" is a timing at which a special motion is executed.

For example, the clothing (01) has no wearing condition. Because of this, the clothing (01) can be put on the robot 100 at any time. A special motion (C01) is correlated to the clothing (01), and the "actuating condition" of the special motion (C01) is 10 o'clock in the morning. When the robot 100 wears the clothing (01), the robot 100 executes the special motion (C01) at a predetermined probability when 10 o'clock in the morning is reached.

The wearing condition of clothing (02) is "an air temperature of 20 degrees or higher". As the clothing (02) is summer wear, the operation control unit 150 executes a refusal operation showing aversion to wearing the clothing (02) when dressed in the clothing (02) when the air temperature is less than 20 degrees. Two special motions (C02 and C03) are correlated to the clothing (02). The "actuating condition" of the special motion (C02) is "music A". When the music A is heard when the clothing (02) is being worn, the operation control unit 150 executes the special motion (C02) at a predetermined selection probability. The "actuating condition" of the special motion (C03) is "three people or more visually recognized". When the incorporated camera of the robot 100 detects three or more "people" when the clothing (02) is being worn, the special motion (C03) is executed at a predetermined selection probability.

A special motion does not need to be fixed. For example, a limited period special motion may be prepared. It is sufficient that the server 200 acquires a latest motion file by regularly accessing the external database 182.

When the clothing (01) and clothing (03) are worn in layers, "a birthday" is set as the "actuating condition". When the clothing (01) and the clothing (03) are put on the robot 100 in layers on the birthday (manufacturing date) of the robot 100, the robot 100 executes a special motion (C05) at a predetermined probability. When the equipment detecting unit 186 detects a multiple of clothing IDs, the equipment detecting unit 186 determines that clothing is being worn in layers. Action restriction information when clothing is worn in layers may be prepared separately, or operation correction may be carried out based on action restriction information of clothing worn as the bottommost of multiple items of clothing worn in layers. Operation correction may also be carried out by calculating a restriction value for each actuator by adding restriction conditions of each of multiple items of clothing.

Action restriction information and a special motion may also be correlated to adornments other than clothing. A wig, a hat, a pochette, an accessory, a necktie, spectacles, and the like are conceivable as adornments. A special motion in accordance with a smell such as perfume may also be prepared. It is sufficient that the equipment detecting unit 186 detects that an adornment is being worn by detecting ID identifying the adornment. Furthermore, action restriction information or a special motion may be correlated in response to a combination of clothing and an adornment, or a multiple of adornments. Further, the operation control unit 150 may cause behavioral characteristics of the robot 100 to change based on the action restriction information or special motion corresponding to these combinations.

Heretofore, the robot 100 and the robot system 300 including the robot 100 have been described, based on an embodiment.

The robot 100 performs an action selection that cannot be patterned using one or more action maps, and which is difficult to predict and animal-like.

A person's behavior is affected by various factors, with clothing being one thereof. A person's mood changes in accordance with clothing, and behavior also changes. The robot 100 emulates human-like behavioral characteristics by behavioral characteristics being changed in accordance with clothing. It is not desirable that movement of the robot 100 becomes excessively dull when wearing clothing. By the outputs of each kind of actuator being regulated subtly in accordance with clothing, the robot 100 can "wear clothing well".

A person feels a desire to put clothing on a pet owing to a mentality of wanting to enjoy a special feeling of "my pet is special" by putting cute clothing on the pet, even though the pet looks the same as others. Also, there may also be a feeling of wanting something to dress in cute children's clothing again after a child grows up. The robot 100 in this embodiment can respond to this kind of natural expression of affection by a person.

A clothing maker can also be provided with a new business opportunity by a combination of the robot 100 and clothing. A clothing maker can develop a new customer base by thinking of clothing that suits the robot 100, and a wearing condition, an actuating condition, and a special motion appropriate to the clothing. In addition to the robot 100, the invention has a possibility of invigorating commerce connected with the robot 100.

The invention not being limited to the heretofore described embodiment or a modified example, components can be changed or embodied without departing from the scope of the invention. Various inventions may be formed by a multiple of the components disclosed in the heretofore described embodiment or the modified example being combined as appropriate. Also, some components may be eliminated from the total of components shown in the heretofore described embodiment or the modified example.

Although a description has been given assuming that the robot system 300 is configured of one robot 100, one server 200, and the multiple of external sensors 114, one portion of the functions of the robot 100 may be realized by the server 200, and one portion or all of the functions of the server 200 may be allocated to the robot 100. One server 200 may control a multiple of the robot 100, or a multiple of the server 200 may control one or more of the robot 100 in cooperation.

A third device other than the robot 100 and the server 200 may manage one portion of functions. A collection of the functions of the robot 100 and the functions of the server 200 described in FIG. 7 can also be comprehensively grasped as one "robot". It is sufficient that a method of distributing the multiple of functions needed in order to realize the invention with respect to one or multiple items of hardware is determined with consideration to the processing capability of each item of hardware, specifications required of the robot system 300, and the like.

As heretofore described, "the robot in a narrow sense" is the robot 100 excluding the server 200, but "the robot in a wide sense" is the robot system 300. It is thought that there is a possibility of many functions of the server 200 being integrated in the robot 100 in future.

The robot 100 in this embodiment carries out operation correction based on action restriction information correlated to clothing. As a modified example, the robot 100 may carry out operation correction while actually executing various kinds of operation. For example, the robot 100 regularly measures the output and the operating amount of an actuator, and records the measurement results as operation data. It is sufficient that the operation control unit 150 refers to the operation data, and regulates output using feedback control when there is a deviation between the operating amount envisaged from the actuator output and the actual operating amount.

The robot 100 may set a predetermined output value for an actuator, and measure the operating amount at the time. Multiple kinds of action restriction setting are prepared in advance, from an action restriction setting that specifies an operation regulation method corresponding to slight action restrictiveness, to an action restriction setting that specifies an operation regulation method corresponding to large action restrictiveness. The restriction determining unit 188 may determine the magnitude of action restriction from the operation data, and determine which action restriction setting the magnitude corresponds to. Action restriction information shown in FIG. 9 is correlated to each action restriction setting. It is sufficient that the operation control unit 150 carries out operation correction in accordance with the action restriction setting. In this case, even when the robot 100 does not detect clothing ID, action restrictiveness is determined while actually operating an actuator, and operation correction can be carried out appropriately in accordance with the action restrictiveness.

Clothing and action restriction information may be correlated, or a clothing attribute and action restriction information may be correlated. For example, various attributes, such as a weight or texture of clothing, and action restriction information may be correlated. In a case of clothing of a weight of one kilogram or more, to what extent output of an actuator x is to be regulated may be defined in advance.

Wearing of clothing may be detected based not only on clothing ID, but also on physical information. This is, for example, image recognition by the camera, touching of a capacitive sensor, or the like. Also, a touch sensor may be installed in a predetermined place, or preferably a multiple of places, on the outer skin 314 of the robot 100, and a wearing detected from a detection noise emitted by the touch sensor when clothing is worn. A light sensor such as a CdS (cadmium sulfide) cell may be installed in a multiple of places on the robot 100, and it may be determined that clothing has been put on when detected light becomes weaker in the daytime. In addition to this, the weight of clothing may be recognized using a strain gauge provided on the pivot shaft 378 or the like.

The heretofore described various kinds of wearing detection method and wearing detection using clothing ID may be used together. Despite clothing ID being detected, the operation control unit 150 may execute a report operation when a wearing of clothing cannot be confirmed by the camera or the like. This is because in this case, there is a possibility that the clothing is not being worn correctly. The operation control unit 150 may express by action the matter that the clothing is not being worn correctly using a report operation or a refusal operation. The same applies to a wearing of an adornment.

When clothing or an adornment is worn, not only is a new motion added as a special motion, but regulation of a basic motion may also be carried out. For example, when clothing A is worn, the selection probability of a basic motion A may be reduced, or one portion of unit motions configuring a basic motion B may be replaced or omitted. When the clothing A is worn, a new unit motion may be added to a basic motion C, or an interval of a basic motion D may be regulated. Using this kind of fine adjustment, behavior changing just a little in accordance with clothing can be expressed. For example, behavior such that the robot 100 becomes slightly quieter when wearing expensive clothing can be expressed.

Categories such as "formal", "expensive", "thinness", "sleeved or sleeveless", and "coloring" may be correlated to clothing, and an action regulation method in accordance with category, and a special motion corresponding to category, may be set. According to this kind of setting, a subtle behavioral expression such as a peculiar movement when wearing red clothing, or a peculiar movement when wearing red, expensive clothing, can be carried out.

Clothing and emotion may be combined. For example, a setting such that a special motion selection probability increases when wearing red clothing when a loneliness emotion is strong is conceivable. In addition to emotion, a combination of external environment information, such as weather or brightness (amount of light), and clothing is conceivable. The special motion selection probability may decrease in accordance with the age (number of years elapsed since manufacture) of the robot. The older the robot, the more difficult it is to execute a special motion, because of which "aging" of the robot can be expressed.

In this embodiment, a clothing RFID is described as transmitting clothing ID. As a modified example, not only clothing ID, but also clothing attribute information may be stored in an IC chip sewn into clothing. The robot 100 may acquire clothing attribute information corresponding to clothing ID from a clothing IC chip.

In addition to an actuator, a detection voltage (detecting power) of a sensor may also be corrected when clothing is worn. For example, when a capacitive sensor is installed over a wide range of the outer skin 314 and a touch by an owner is detected, it is thought that touch detecting sensitivity decreases when clothing is worn. When a putting on of clothing is detected, the robot 100 may correct the detecting sensitivity by increasing the detection voltage of the capacitive sensor.

In this embodiment, the robot 100 alleviates action restrictiveness by increasing actuator output so that there is no excessive action restriction due to clothing. As a modified example, actuator output may be increased beyond action restriction. In this case, despite being physically difficult to move when certain clothing is worn, an action of moving lightly can be expressed instead. In this case, an emotion of feeling free and easy when wearing certain clothing can be expressed by action.

When a wearing of clothing is detected in a state in which clothing ID cannot be detected, the robot 100 may execute a refusal action showing aversion to wearing the clothing. Also, action restriction information cannot be acquired when clothing ID cannot be detected, because of which, in this case, the robot 100 may automatically carry out operation correction while checking actuator output and operating amount.

Figure 12:
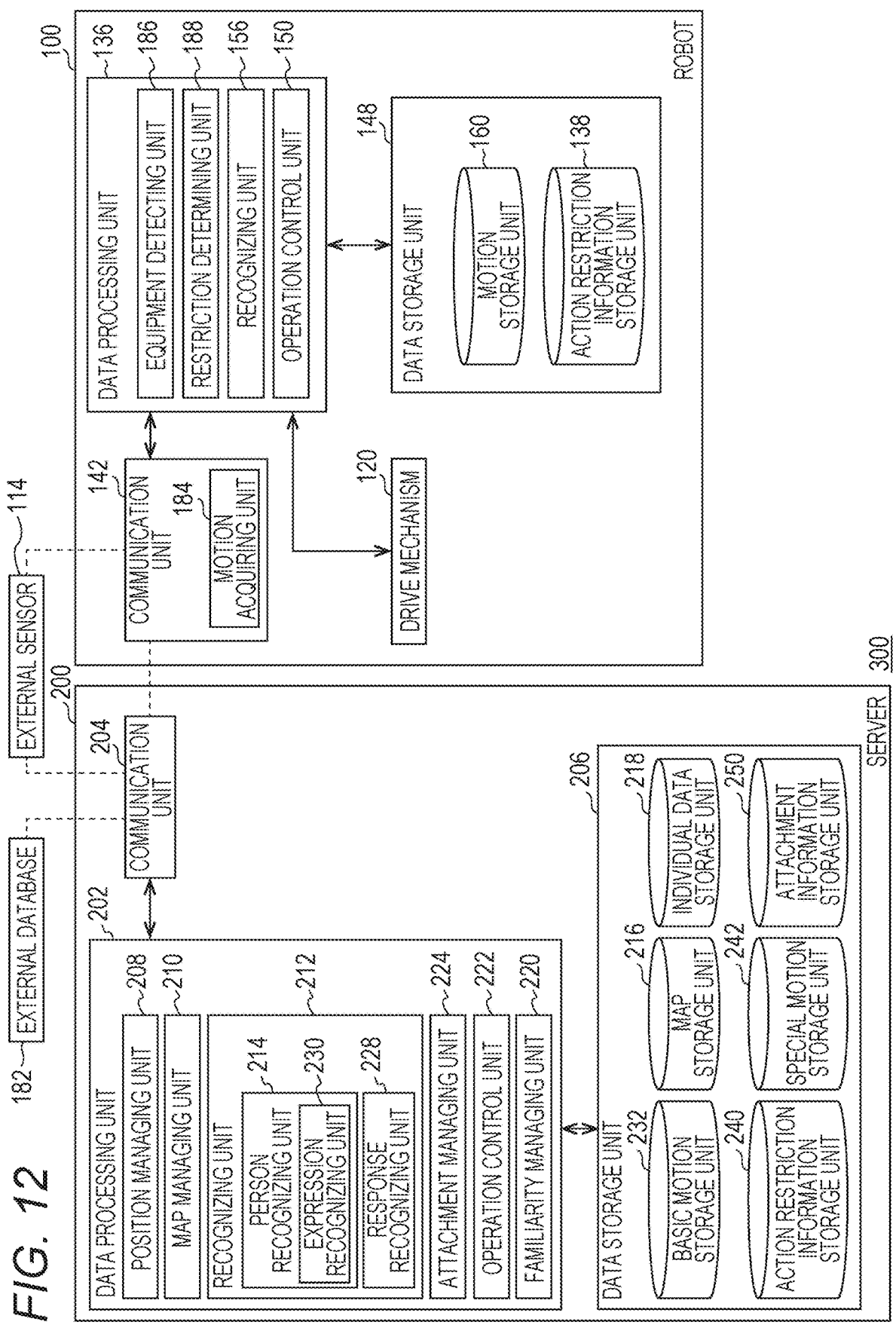
FIG. 12 is a functional block diagram of the robot system in a modified example.

FIG. 12 is a functional block diagram of the robot system 300 in a modified example.

In the robot system 300 of the modified example, the data processing unit 202 of the server 200 includes an attachment managing unit 224. The attachment managing unit 224 manages "attachment" as an index value indicating a magnitude of attachment of the robot 100 to clothing. The data storage unit 206 includes an attachment information storage unit 250. The attachment information storage unit 250 is a database in which attachment to clothing is set. A data structure of the attachment information storage unit 250 will be described hereafter in connection with the following FIG. 13.

FIG. 13 is a data structure diagram of the attachment information storage unit 250.

Attachment to clothing is indexed in a range from −100 (dislike) to +100 (like). According to FIG. 13, attachment to the clothing (02) is 84, meaning that the robot 100 favors the clothing (02). Meanwhile, attachment to clothing (04) is −90, meaning that the robot 100 dislikes the clothing (04). Also, attachment to clothing (05) is 0, meaning that the robot 100 feels neutral about the clothing (05).

The attachment managing unit 224 changes attachment in accordance with a responsive action of a user toward the robot 100. As heretofore described, the response recognizing unit 228 recognizes a responsive action performed with respect to the robot 100, and classifies the action as a pleasant or unpleasant action. When a pleasant action is recognized when the robot 100 is wearing the clothing (01), the attachment managing unit 224 increases attachment to the clothing (01). Meanwhile, when an unpleasant action is recognized when the robot 100 is wearing the clothing (02), the attachment managing unit 224 reduces attachment to the clothing (02). As a result of this, an experience connected to clothing and an accompanying pleasant or unpleasant emotion (memory) are reflected as attachment to the clothing. For example, being hugged, being stroked, being watched closely, continuously visually recognizing a user with familiarity of a predetermined value or greater for a predetermined time or longer, a number of times a user smiles being high compared with a past record, receiving positive words from a user such as "you look cute", "that suits you", "that's cool", and the like are conceivable as pleasant actions. Being hit, being dropped, being kicked, not being able to visually recognize a user with familiarity of a predetermined value or greater for a predetermined time or longer, a number of times a user smiles being low compared with a past record, receiving negative words from a user such as "you don't look cute", "that doesn't suit you", "that's nerdy", and the like are conceivable as unpleasant actions.

The operation control unit 150 of the robot 100 (or the operation control unit 222 of the server 200) changes behavioral characteristics of the robot 100 in accordance with attachment to clothing. For example, when the robot 100 is wearing clothing to which attachment is higher than a threshold T1, the operation control unit 150 may set the output value of each actuator higher than usual. In FIG. 8, the output P2 is set for realizing the operating amount D2. When the attachment to the clothing is higher than the threshold T1, the operation control unit 150 may set an output P3 higher than the output P2. According to this kind of control method, movement of the robot 100 becomes more lightly than usual when wearing liked clothing.

On the other hand, when the robot 100 is wearing clothing to which attachment is lower than a threshold T2 (<the threshold T1), the operation control unit 100 may set the output value of each actuator lower than usual. In FIG. 8, an output P4 lower than the output P2 for realizing the operating amount D2 may be set. According to this kind of control method, movement of the robot 100 becomes more ponderous than usual when wearing disliked clothing. By lightness of movement of the robot 100 being changed in accordance with attachment to clothing, preference of the robot 100 with respect to clothing can be expressed by action.

As heretofore described, a special motion is correlated to clothing. When the robot 100 wears clothing, and the actuating condition of the special motion is met, the robot 100 executes the special motion at a predetermined probability. The operation control unit 222 may change the selection probability of the special motion in accordance with attachment. That is, the operation control unit 222 may set the selection probability of the special motion higher the greater the attachment to the clothing, and set the selection probability of the special motion lower the less the attachment to the clothing. According to this kind of control method, liking of the robot 100 for clothing can be expressed by action in accordance with a likelihood of executing a special motion.

In addition to this, the operation control unit 222 may change the selection probability of a predetermined basic motion correlated to a behavioral expression of "pleasure", "happiness", or "enjoyment" when the robot 100 follows a user, or the like, in accordance with attachment. The operation control unit 222 may change the length of an interval in accordance with attachment. Specifically, the operation control unit 222 may express a brisk movement of the robot 100 by setting the interval to be shorter the greater the attachment to clothing. In the same way, the operation control unit 222 may express ponderousness of the robot 100 by setting the interval to be longer the less the attachment to clothing. According to this kind of control method too, behavioral expressions such as "feeling on top of the world wearing its favorite clothes", and "feeling down having to wear clothes it doesn't like", can be realized.

The operation control unit 222 may change behavioral characteristics of the robot 100 in accordance with attachment to clothing not only when the clothing is being worn, but also before the clothing is put on. When a user puts clothing on the robot 100, the recognizing unit 212 recognizes the clothing from an image. Image information may be correlated to each item of clothing in the attachment information storage unit 250. The recognizing unit 212 may identify clothing by comparing a clothing image filmed by the camera and a clothing image registered in the attachment information storage unit 250, and the operation control unit 222 may change behavioral characteristics of the robot 100 in accordance with the attachment to the clothing.

The operation control unit 222 may select a motion of the robot 100 in accordance with attachment to clothing presented. For example, the basic motion storage unit 232 defines motions of pleasure such as rotating, or raising the arm 106, and motions of refusal such as backing off, running away, or turning away. The operation control unit 222 may select a motion of pleasure when clothing with an attachment of a predetermined value or higher, for example 70 or higher, is presented, and execute a motion of refusal when clothing with an attachment of a predetermined value or lower, for example −40 or lower, is presented. According to this kind of control method, an "opinion" of the robot 100, such as "I want to wear that" or "I don't want to wear that", can be expressed by action before putting on the clothing.

Attachment may be changeable in accordance with a responsive action, or a fixed value may be set for each item of clothing. Also, there may be clothing to which attachment is liable to change in response to a responsive action, and clothing to which attachment is unlikely to change. The attachment managing unit 224 may revise attachment in accordance with season or air temperature. For example, when clothing for which the wearing condition is not met is put on the robot 100, the attachment managing unit 224 may revise the attachment to the clothing downward. In the same way, the attachment managing unit 224 may revise the attachment to clothing upward every time the clothing is worn. Conversely, with regard to clothing for which time has elapsed since last being worn, the attachment managing unit 224 may gradually reduce the attachment to the clothing in accordance with the elapse of time.

When attachment to red clothing A increases, the attachment managing unit 224 may increase attachment to other red clothing B. According to this kind of control method, "liking" of an "attribute" "red" can also be expressed. In the same way, when attachment to black clothing C decreases, the attachment managing unit 224 may also reduce attachment to other black clothing D. According to this kind of control method, "disliking" of an "attribute" "black" can be expressed.

Although a waterproofing process is performed on the robot 100, going outside in the rain is not recommended. Meanwhile, the robot 100 can go outside in the rain when wearing waterproofing equipment such as rainwear. By wearing a wet suit, the robot 100 can also enter a swimming pool or a bath. The equipment detecting unit 186 may detect a wearing of waterproofing equipment using image recognition, an RFID, or the like. The recognizing unit 212 recognizes a going out in the rain, or a movement to a bathroom, a swimming pool, or the like, using image recognition. When recognizing a going out in the rain or the like in a state in which waterproofing equipment is not being worn, the operation control unit 222 executes the heretofore described refusal motion.

The robot 100 may recognize clothing using an RFID or image recognition. In addition to this, the equipment detecting unit 186 may identify a category of clothing by a plastic card attached to the clothing being inserted in an insertion opening formed in the robot 100. One or more holes are formed in the plastic card, and clothing ID is specified by a number and a position of the holes. Clothing may be recognized using this kind of punch card method. The equipment detecting unit 186 may recognize a clothing category using a two-dimensional code attached to the clothing.

As heretofore described, a special motion is correlated to clothing. When the robot 100 wears clothing, and the situation in which the robot 100 is placed fulfils the actuating condition of the special motion, the robot 100 executes the special motion. Whether or not the actuating condition is met is determined using information obtained from the various kinds of sensor included in the robot 100 or a communication function. The actuating condition is defined by including information specifying a device to be used in the determination, and a determination condition for a detection value of the device. For example, when the actuating condition is defined as "when the room temperature reaches 25 degrees or higher", and a "temperature sensor" is specified as the determining device, "25 degrees or higher" is specified as the determination condition. When the actuating condition is "when the music A is heard", a "microphone" is specified as the determining device, and a waveform pattern, a specific volume, or the like of the music A is specified as the determination condition. Also, multiple conditions may be specified, such as "when the music A is heard, and a user is present". Of course, the actuating condition itself may be provided as a program such as a script that can be executed in the data processing unit 136 of the robot 100, a program module for determining the actuating condition with a wearing of clothing as a trigger read in, and a determining process carried out as required as an actuating condition determining unit. In the same way, the heretofore described wearing condition is also defined by including information specifying a device to be used in the determination, and a determination condition for a detection value of the device.

Furthermore, the wearing condition itself may be provided as a program that can be executed in the data processing unit 136 of the robot 100, a program module for determining the wearing condition with a wearing of clothing as a trigger read in, and a determining process carried out as required as a wearing condition determining unit. When a wearing of clothing is detected by the equipment detecting unit 186, the wearing condition correlated to the clothing is determined, after which the actuating condition is determined as required.

Although it is assumed that the equipment detecting unit 186 carries out a detection operation when clothing has been put on, it is predicted that when the robot 100 operates in a state of wearing clothing, the wearing state will change due to the clothing slipping or tearing during operation. Because of this, the equipment detecting unit 186 and the restriction determining unit 188 may detect the wearing state at a certain time interval. Also, when the robot 100 stops for a predetermined time or longer for charging or the like, the wearing state may be detected before starting an action again from the stopped state.

What is claimed is:

1. An autonomously acting robot, comprising:
a non-transitory computer readable medium configured to store instructions thereon;
a sensor configured to detect a touch on a body surface of the autonomously acting robot;
a detector configured to detect whether the autonomously acting robot is wearing clothing;
a processor connected to the non-transitory computer readable medium, wherein the processor is configured to execute the instructions for:
specifying an operation of the autonomously acting robot, wherein the specifying the operation comprises changing behavioral characteristics of the autonomously acting robot in response to a determination that the autonomously acting robot is wearing clothing, and
increasing sensitivity of the sensor in response to the determination that the autonomously acting robot is wearing clothing;
a drive mechanism configured to execute the specified operation.

2. The autonomously acting robot according to claim 1, further comprising a restriction determining sensor configured to restriction to movement of the autonomously acting robot, wherein the processor is further configured to execute the instructions for:
determining an action restrictiveness of the clothing based on an output from the restriction determining sensor, and
regulating the drive mechanism based on the determined action restrictiveness of the clothing.

3. The autonomously acting robot according to claim 2, wherein the processor is further configured to execute the instructions for determining the action restrictiveness of the clothing based on a predetermined correlation between action restriction information and identifying information for the clothing.

4. The autonomously acting robot according to claim 3, wherein the processor is further configured to execute the instructions for executing a predetermined report operation in response to the determined action restrictiveness differing from the action restriction information associated with the clothing.

5. The autonomously acting robot according to claim 2, wherein the processor is further configured to execute the instructions for:
selecting an action restriction setting from a plurality of action restriction settings based on operation data of the drive mechanism after the autonomously acting robot is detected to be wearing clothing, and
regulating the drive mechanism in accordance with the selected action restriction setting.

6. The autonomously acting robot according to claim 1, further comprising a restriction determining sensor configured to restriction to movement of the autonomously acting robot, wherein the processor is further configured to execute the instructions for:
determining action restrictiveness of the clothing based on an output of the restriction determining sensor, wherein a magnitude of the action restrictiveness is determined based on operation data of the drive mechanism in response to (1) the processor not receiving clothing identification information and (2) the detector indicating the autonomously acting robot is wearing clothing, and
regulating the drive mechanism based on the determined action restrictiveness.

7. The autonomously acting robot according to claim 4, wherein
the detector is configured to detect clothing identification information, and the processor is further configured to execute the instructions for:

regulating the drive mechanism based on action restriction information correlated in advance to the clothing identification information, and executing the predetermined report operation in response to the determined action restrictiveness differing from the action restriction information.

8. The autonomously acting robot according to claim 1, wherein the processor is further configured to execute the instructions for changing the sensitivity of the sensor based on a category of the clothing.

9. The autonomously acting robot according to claim 1, wherein the processor is further configured to execute the instructions for changing the behavioral characteristics of the autonomously acting robot based on a category of the clothing.

10. The autonomously acting robot according to claim 9, wherein the processor is further configured to execute the instructions for executing a predetermined refusal operation in response to the worn clothing failing to satisfy a wearing condition based on the category of clothing.

11. The autonomously acting robot according to claim 10, wherein the processor is further configured to execute the instructions for selecting a specific operation correlated to the clothing.

12. The autonomously acting robot according to claim 11, wherein the processor is further configured to execute the instructions for acquiring a motion file defining the specific operation from an external database.

13. The autonomously acting robot according to claim 11 wherein the processor is further configured to execute the instructions for selecting the specific operation in response to an actuating condition correlated to the specific operation is detected.

14. The autonomously acting robot according to claim 1, wherein the processor is further configured to execute the instructions for:

recognizing an adornment worn by the autonomously acting robot based on information from the detector indicating a category of the clothing, and changing the behavioral characteristics of the autonomously acting robot based on a combination of the clothing and the adornment.

15. The autonomously acting robot according to claim 1, wherein the detector is configured to determine a wearing state of the clothing, and the processor is further configured to execute the instructions for executing an operation refusing to wear clothing in response to a predetermined wearing state differing from the determined wearing state of the clothing.

16. The autonomously acting robot according to claim 1, wherein the detector is configured to detect an identity of the clothing, and the processor is further configured to execute the instructions for changing the behavioral characteristics of the robot based on an attachment correlated to the detected identity of the clothing.

17. The autonomously acting robot according to claim 16, wherein the processor is further configured to execute the instructions for:

recognizing the clothing based on a received image, and changing the behavioral characteristics of the autonomously acting robot based on the attachment correlated to the clothing in response to detecting the recognized clothing is worn by the autonomously acting robot.

18. The autonomously acting robot according to claim 16, wherein the processor is further configured to execute the instructions for:

updating an attachment to an article of clothing, wherein the updating the attachment to the piece of clothing is based on a detected action by a user during the autonomously acting robot wearing the piece of clothing.

19. The autonomously acting robot according to claim 18, wherein the processor is further configured to execute the instructions for changing the behavioral characteristics of the autonomously acting robot based on the attachment to the piece of clothing in response to a determination that the autonomously acting robot is wearing the piece of clothing.

20. An autonomously acting robot, comprising:

a non-transitory computer readable medium configured to store instructions thereon;

a detector for detecting a piece of clothing worn by the autonomously acting robot;

a processor connected to the non-transitory computer readable medium, wherein the processor is configured to execute the instructions for:

updating an attachment to the piece of clothing based on a detected action by a user in response to the autonomously acting robot wearing the piece of clothing, recognizing the piece of clothing based on a received image, and specifying an operation of the autonomously acting robot based on the attachment to the piece of clothing in response to the piece of clothing being recognized; and a drive mechanism configured to execute the specified operation.

* * * * *